United States Patent
Back et al.

(10) Patent No.: US 11,310,638 B2
(45) Date of Patent: Apr. 19, 2022

(54) V2X COMMUNICATION DEVICE AND GEO-NETWORKING TRANSMISSION METHOD

(71) Applicant: LG ELECTRONICS INC., Seoul (KR)

(72) Inventors: Seoyoung Back, Seoul (KR); Woosuk Ko, Seoul (KR); Seungryul Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 164 days.

(21) Appl. No.: 16/630,415

(22) PCT Filed: Oct. 11, 2017

(86) PCT No.: PCT/KR2017/011168
§ 371 (c)(1),
(2) Date: Jun. 24, 2020

(87) PCT Pub. No.: WO2019/004519
PCT Pub. Date: Jan. 3, 2019

(65) Prior Publication Data
US 2020/0336870 A1    Oct. 22, 2020

Related U.S. Application Data

(60) Provisional application No. 62/524,589, filed on Jun. 25, 2017.

(51) Int. Cl.
*H04W 4/40* (2018.01)
*H04L 12/741* (2013.01)
(Continued)

(52) U.S. Cl.
CPC ............ *H04W 4/40* (2018.02); *H04L 45/745* (2013.01); *H04L 69/22* (2013.01); *H04W 72/005* (2013.01); *H04W 72/0406* (2013.01)

(58) Field of Classification Search
CPC . H04W 4/40; H04W 72/005; H04W 72/0406; H04W 72/04; H04L 45/745; H04L 45/74; H04L 69/22
See application file for complete search history.

(56) References Cited

U.S. PATENT DOCUMENTS

| | | | |
|---|---|---|---|
| 2015/0163720 | A1 | 6/2015 | Cordeiro De Oliveria Barros et al. |
| 2015/0257152 | A1* | 9/2015 | Hasegawa ............. H04W 16/14 370/329 |

(Continued)

FOREIGN PATENT DOCUMENTS

| | | |
|---|---|---|
| KR | 101526121 | 6/2015 |
| WO | 2017052488 | 3/2017 |

OTHER PUBLICATIONS

PCT International Application No. PCT/KR2017/011168, International Search Report dated Mar. 19, 2018, 4 pages.

(Continued)

*Primary Examiner* — Jenee Holland
(74) *Attorney, Agent, or Firm* — Lee Hong Degerman Kang Waimey

(57) ABSTRACT

A GeoNetworking transmission method of a V2X communication device is disclosed. The GeoNetworking transmission method includes receiving a beacon packet or a single hop broadcast (SHB) packet; configuring location information, the location information including information about at least one neighboring V2X communication device executing a GeoNetworking protocol; determining a forwarder from the neighboring V2X communication devices included in a location table and setting an address of the determined forwarder to a link layer address; and transmitting a GeoNetworking packet to a first service channel (SCH) based on the link layer address.

8 Claims, 20 Drawing Sheets

(51) Int. Cl.
*H04L 29/06* (2006.01)
*H04W 72/00* (2009.01)
*H04W 72/04* (2009.01)
*H04L 29/08* (2006.01)
*H04W 4/02* (2018.01)
*H04W 4/44* (2018.01)
*H04W 4/46* (2018.01)
*H04W 4/80* (2018.01)
*H04W 40/22* (2009.01)
*H04W 40/24* (2009.01)
*H04L 45/745* (2022.01)
*H04L 69/22* (2022.01)

(56) References Cited

U.S. PATENT DOCUMENTS

2017/0142766 A1* 5/2017 Kim ............... H04W 48/20
2017/0181150 A1* 6/2017 Lee ............... H04W 72/1257
2018/0206089 A1* 7/2018 Cavalcanti ...... H04W 36/00837

OTHER PUBLICATIONS

Rangga Priandono, "Design and evaluation of multi-channel operation implementation of ETSI GeoNetworking Protocol for ITS-G5", Aug. 2015, (http://pure.tue.nl/ws/files/47037031/799532-1.pdf), 25 pages.

"Intelligent Transport Systems (ITS); Vehicular Communications; GeoNetworking; Part 4: Geographical addressing and forwarding for point-to-point and point-to-multipoint communications; Sub-part 2: Media-dependent functionalities for ITS-G5", In: ETSI TS 102 636-4-2 V1.1.1, Oct. 2013, 77 pages.

* cited by examiner

[Figure 1]
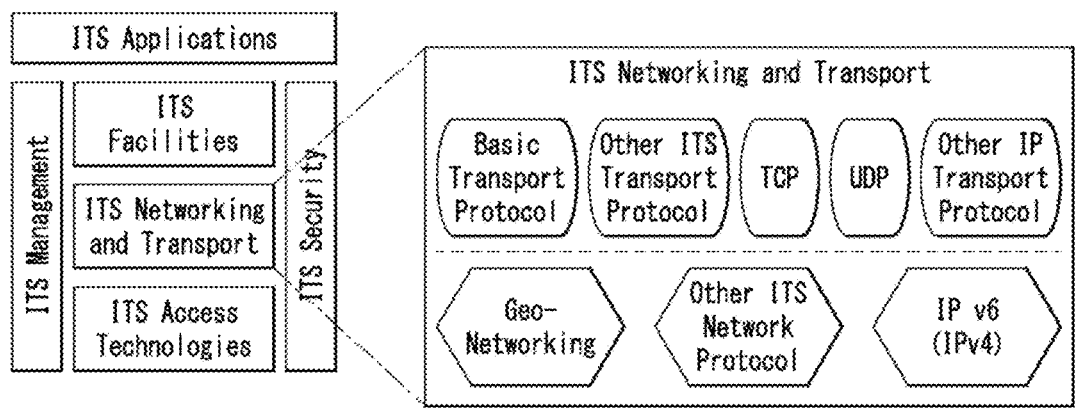
[Figure 2]
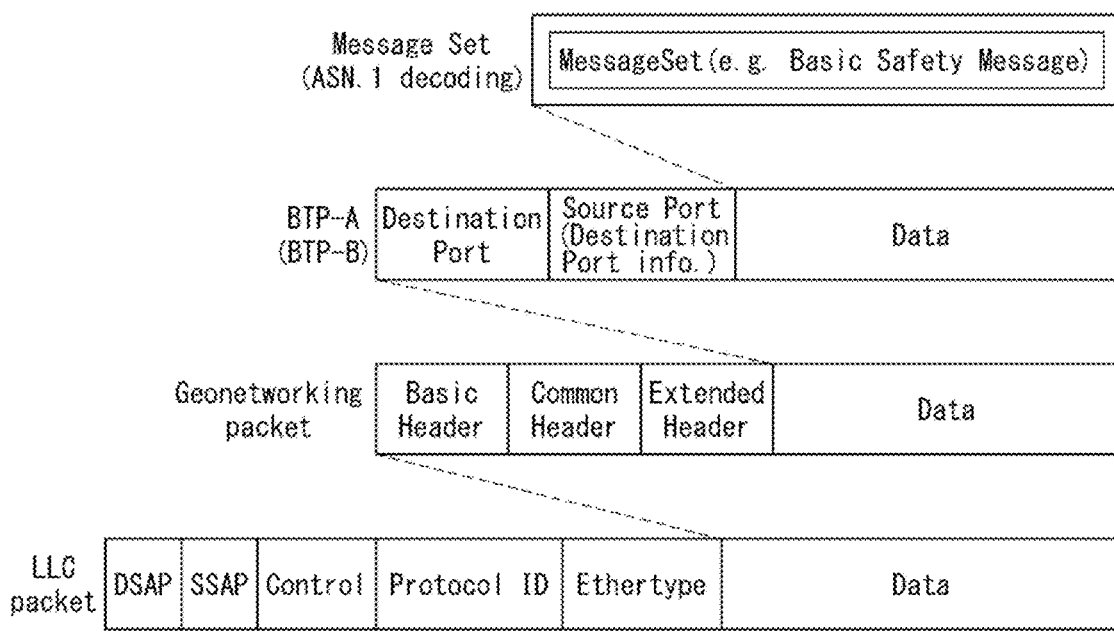

【Figure 3】

```
 0                   1                   2                   3
 0 1 2 3 4 5 6 7 0 1 2 3 4 5 6 7 0 1 2 3 4 5 6 7 0 1 2 3 4 5 6 7
|Version| NH  |    Reserved       |       LT        |     RHL     |
```

(a) Base header

```
 0                   1                   2                   3
 0 1 2 3 4 5 6 7 0 1 2 3 4 5 6 7 0 1 2 3 4 5 6 7 0 1 2 3 4 5 6 7
|  NH   |Reserved|  HT  |  HST  |      TC       |     Flags     |
|              PL                |      MHL      |   Reserved    |
```

(b) Common header

[Figure 4]
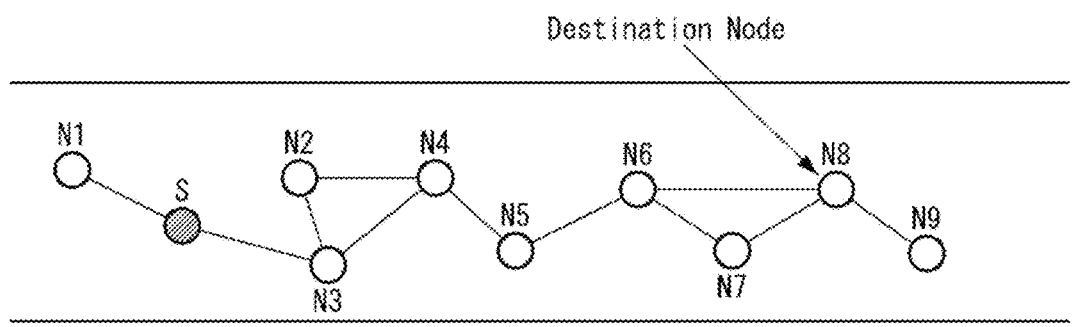
(a) GUC (Geographically-Scoped Unicast)
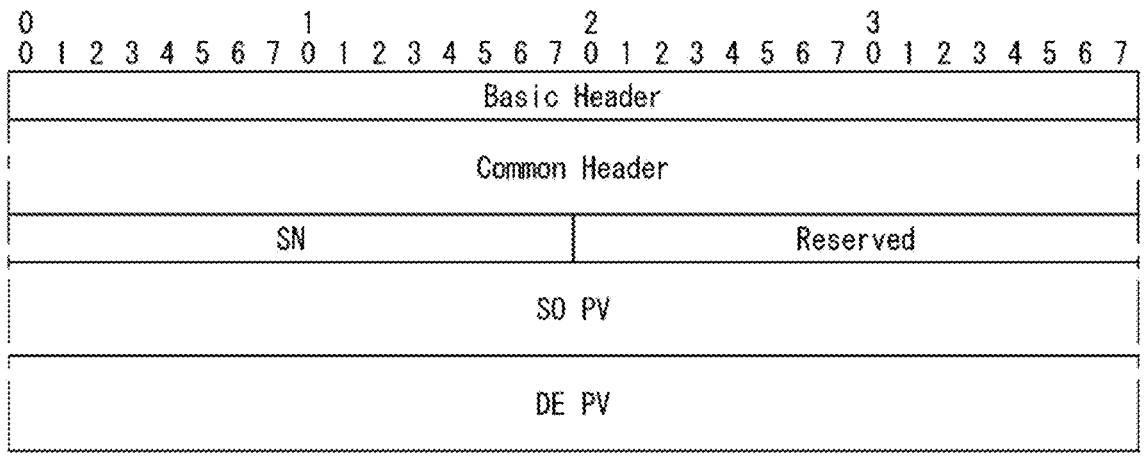
(b) GeoUnicast Packet Header 【Figure 5】
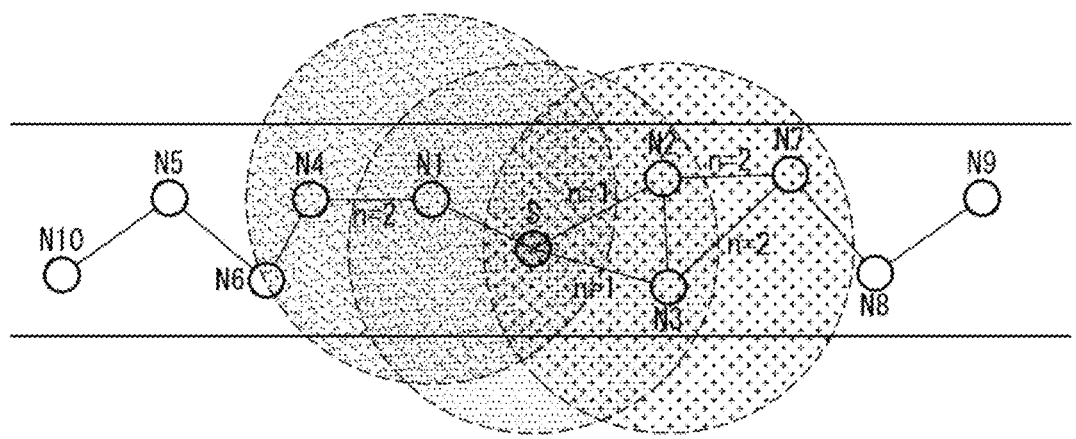
(a) TSB(Topologically Scoped Broadcast)
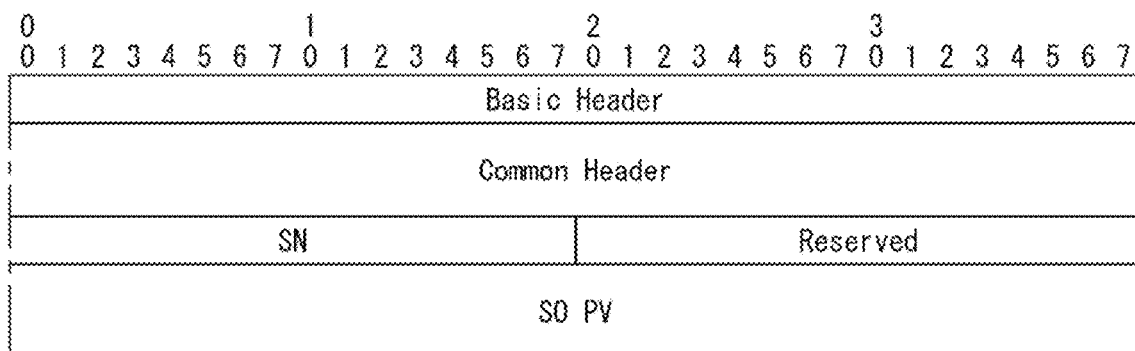
(b) TSB Packet Header

[Figure 6]
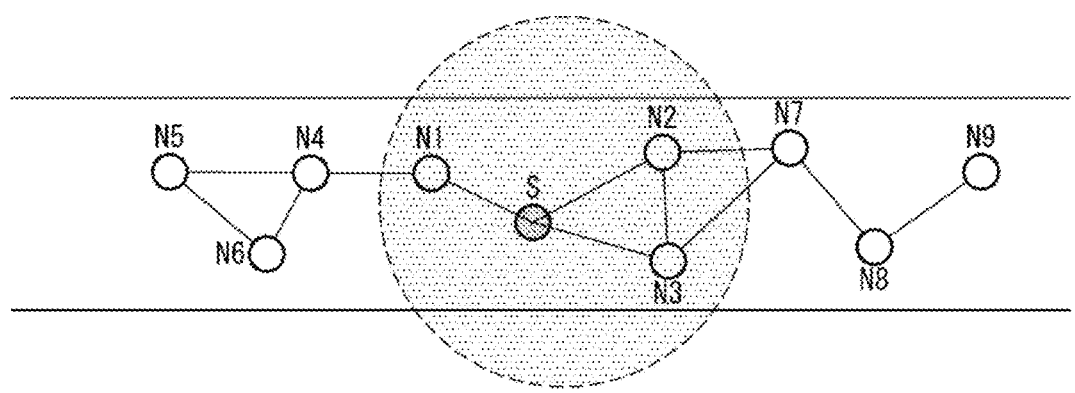
(a) SHB (Single Hop Broadcast)
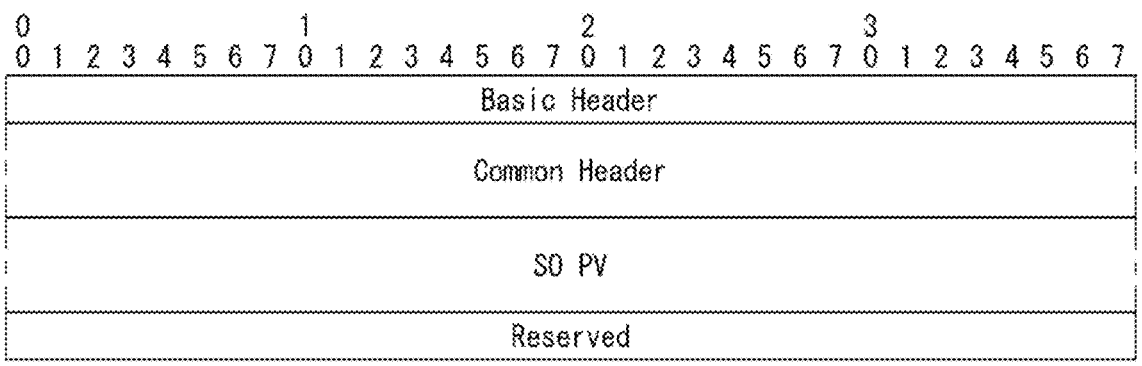
(b) SHB Packet Header

[Figure 7]
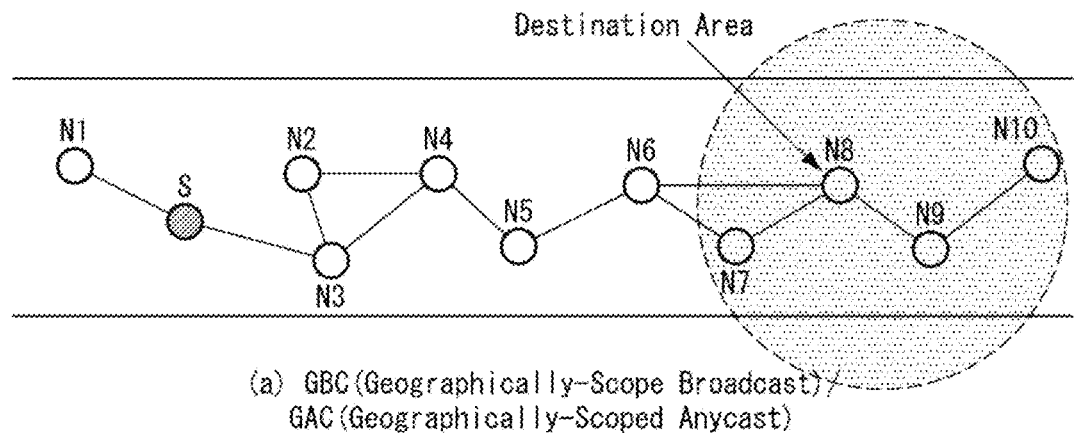
(a) GBC(Geographically-Scope Broadcast)/
GAC(Geographically-Scoped Anycast)
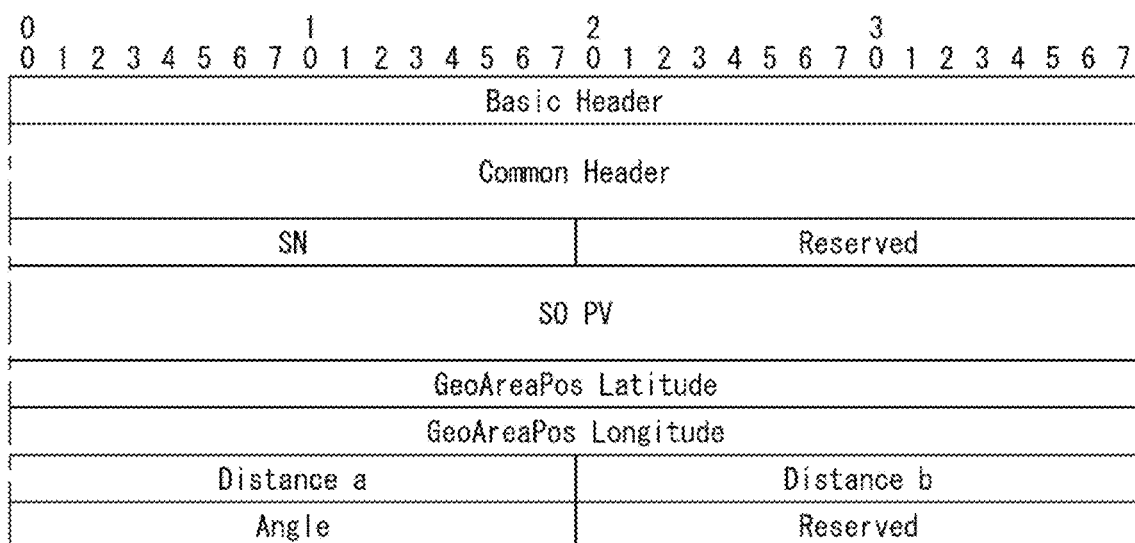
(b) GBC/GAC Packet Header 【Figure 8】
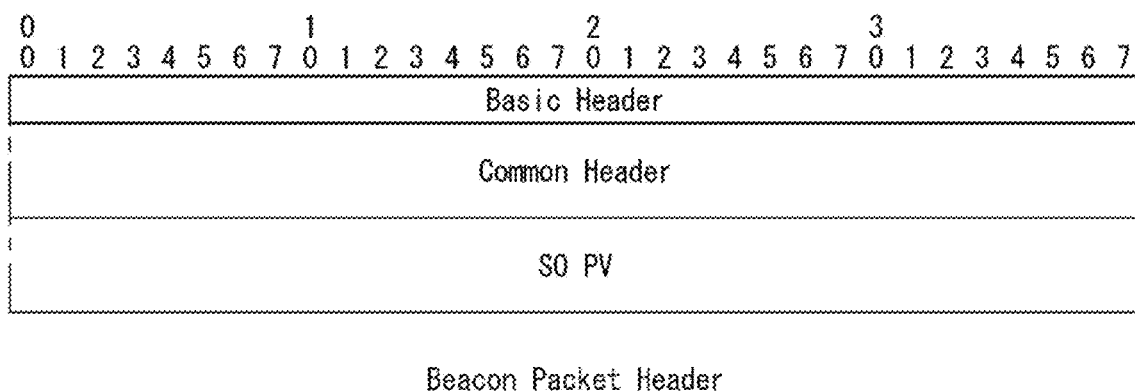
Beacon Packet Header

[Figure 9]
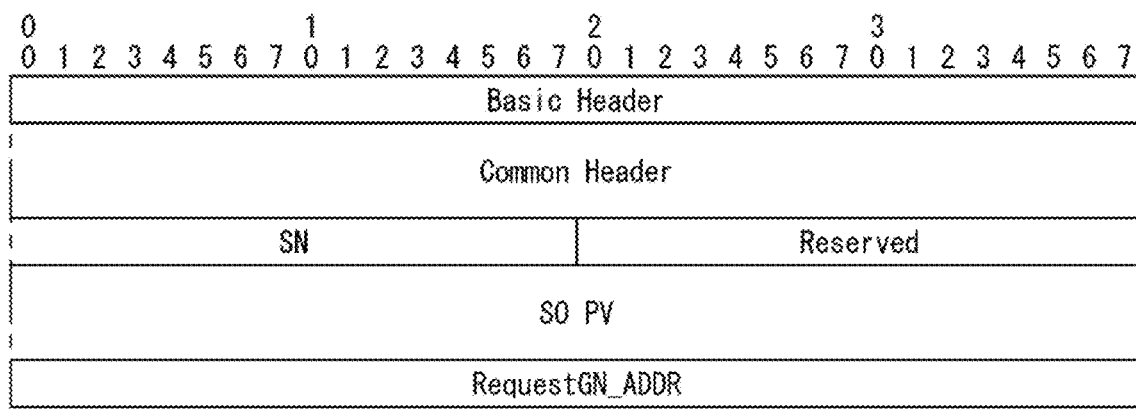
(a) LS Request packet header
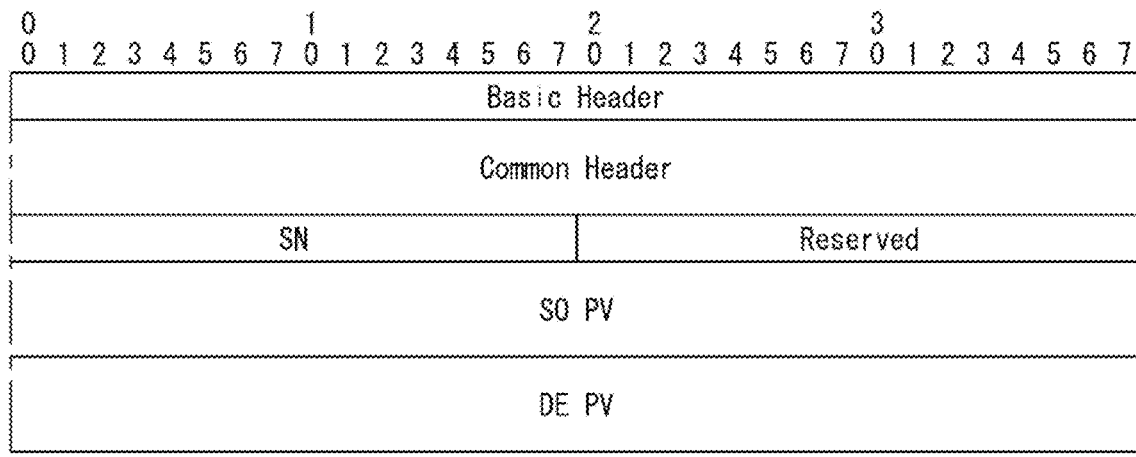
(b) LS Reply packet header 【Figure 10】
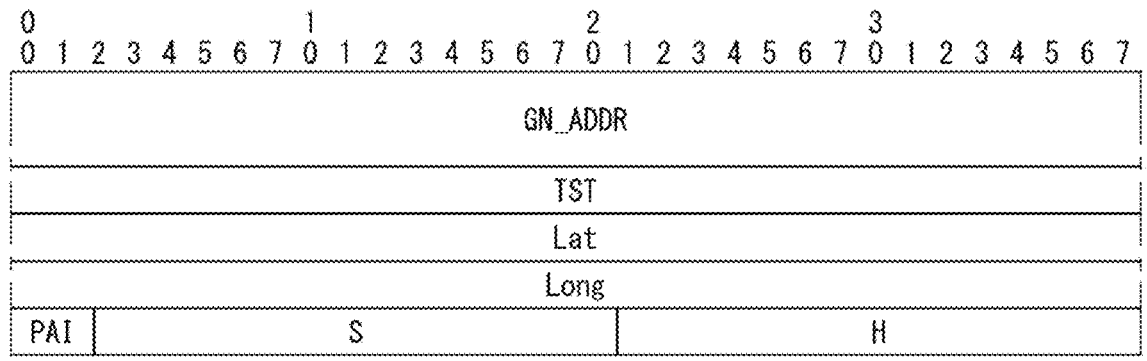
(a) Long Position Vector
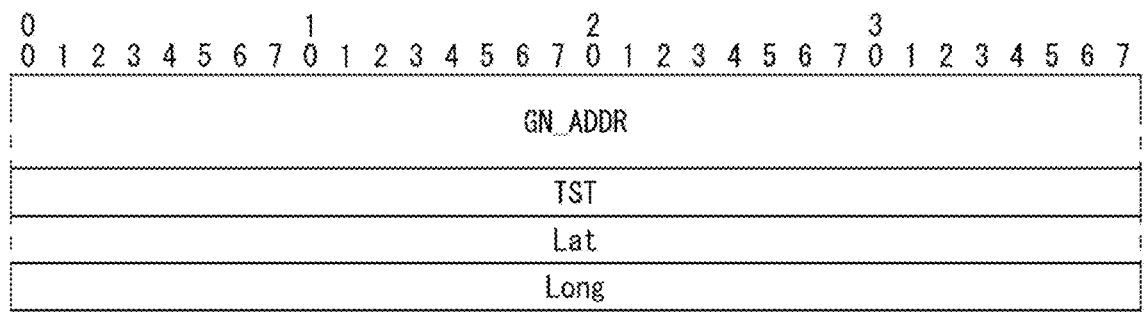
(b) Short Position Vector
【Figure 11】
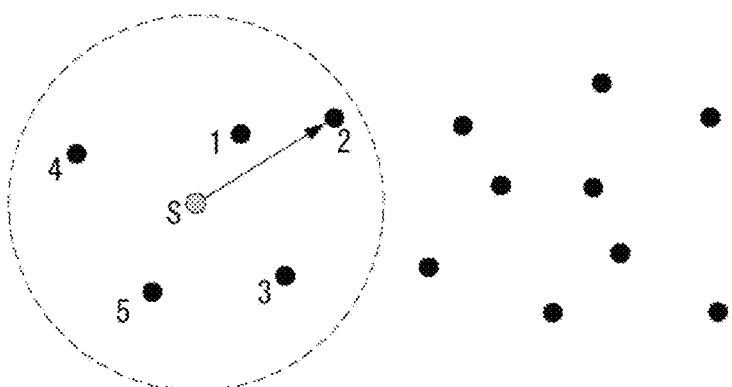

【Figure 12】
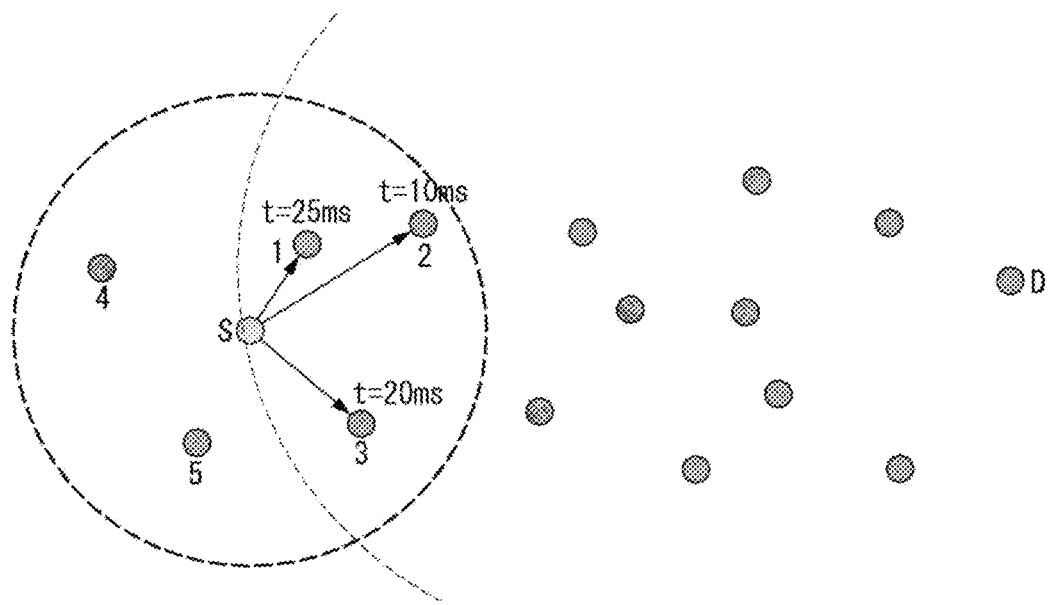
【Figure 13】
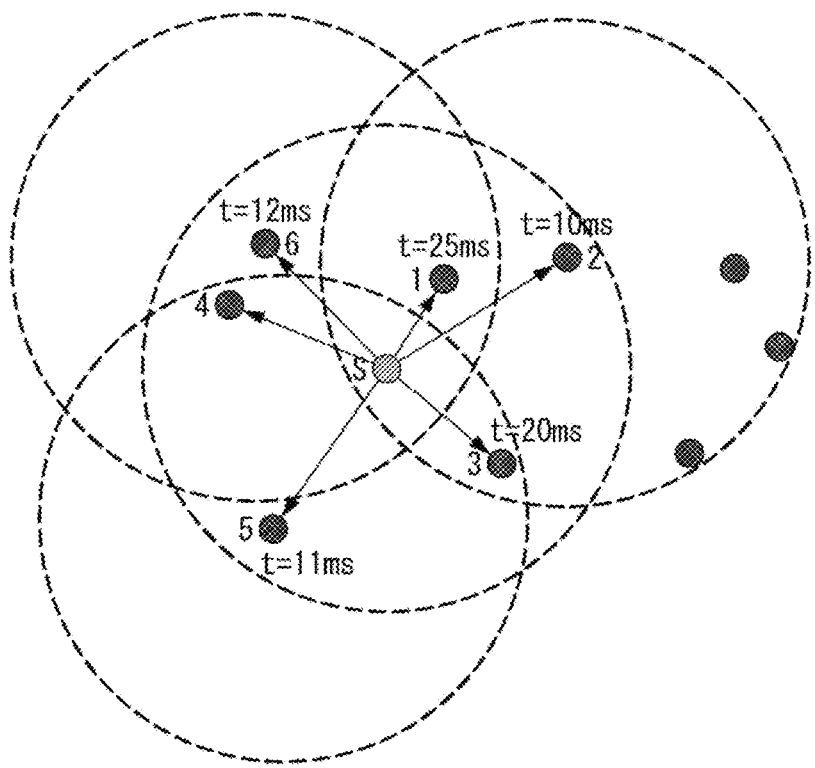

【Figure 14】
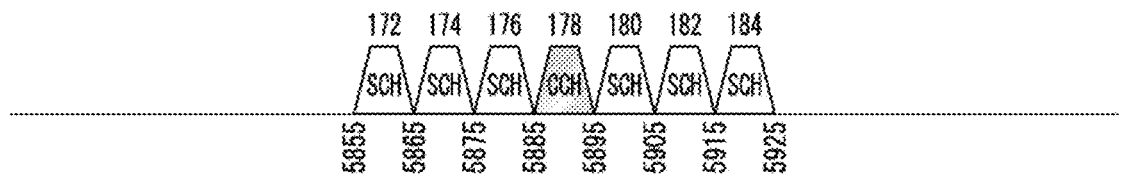
(a)
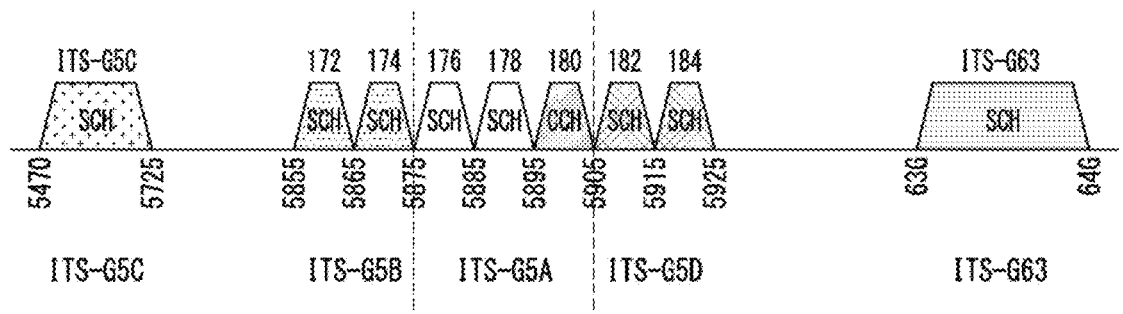
(b)
【Figure 15】
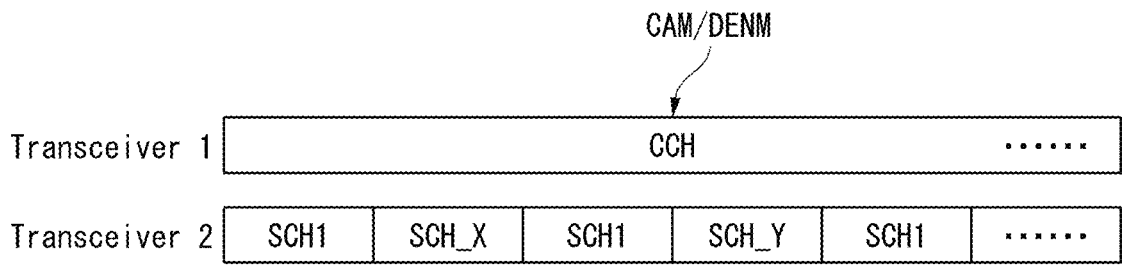

【Figure 16】
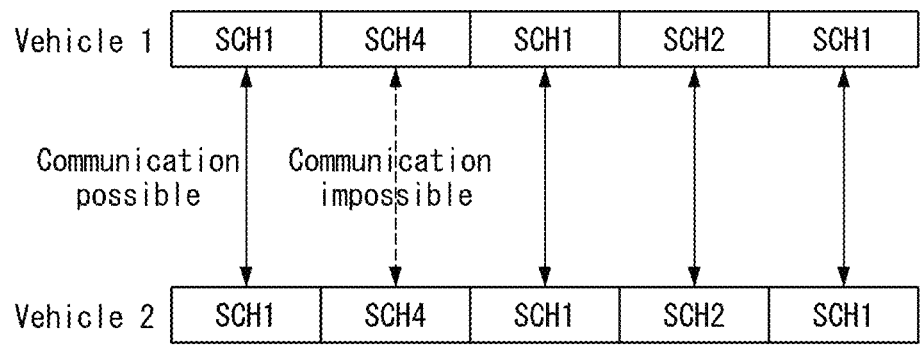
【Figure 17】
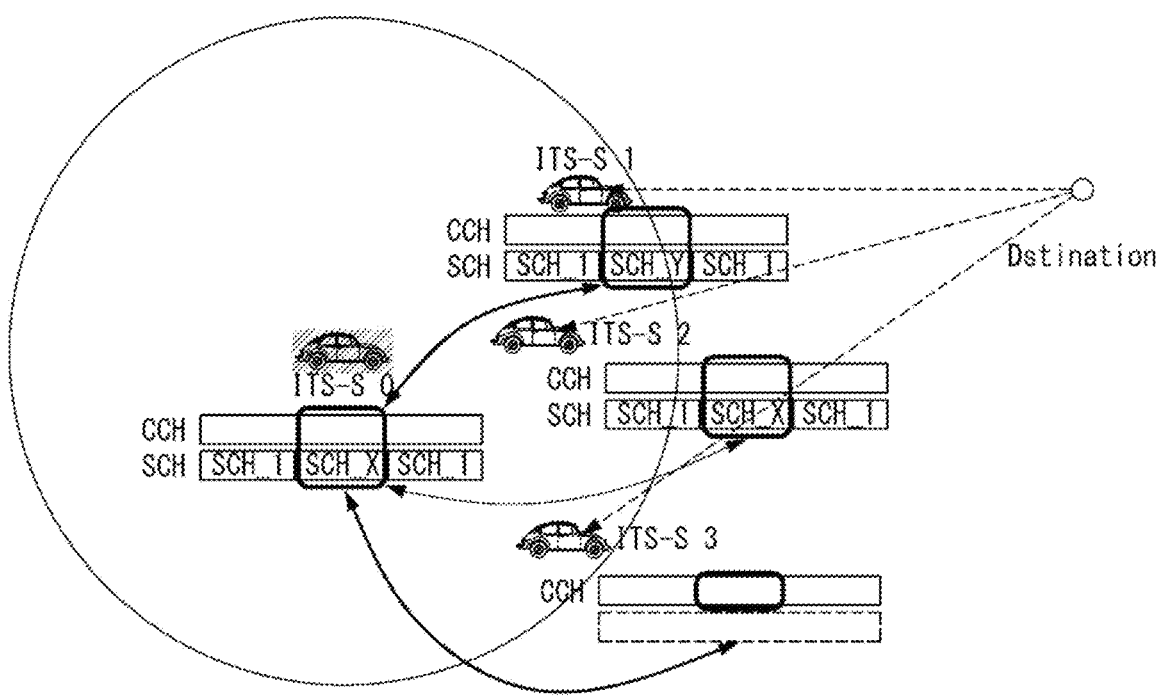

【Figure 18】
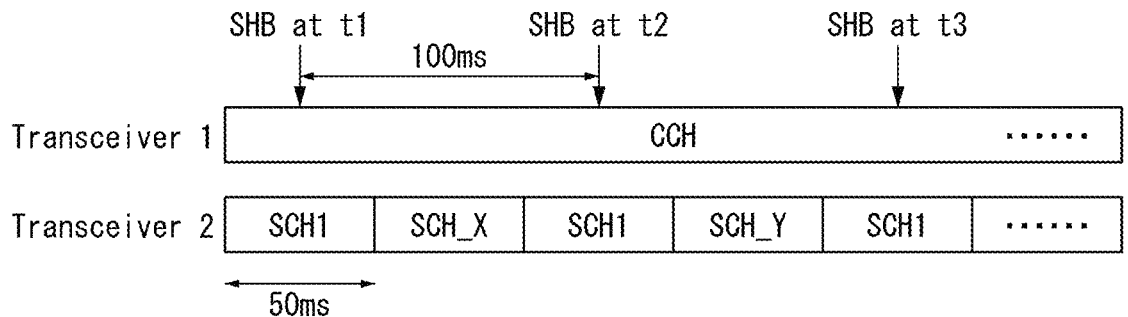
【Figure 19】
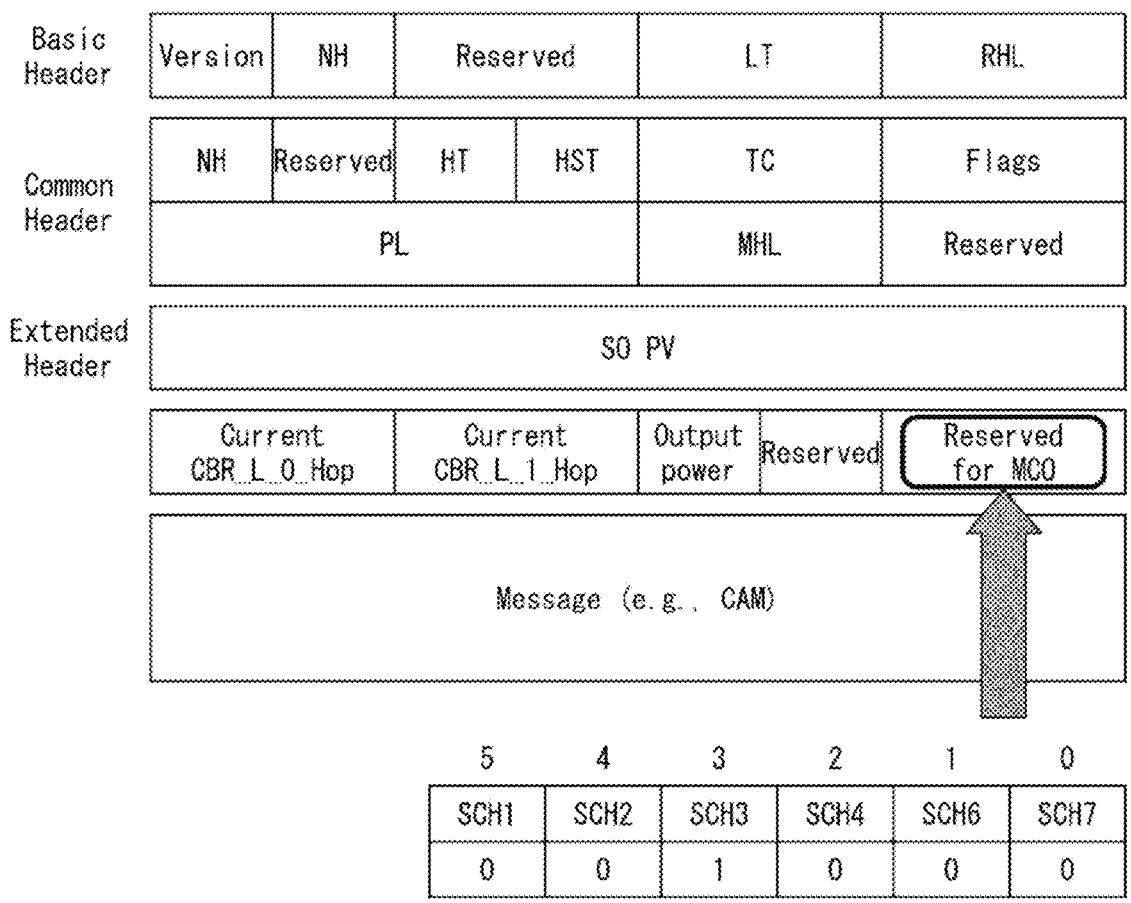

[Figure 20]
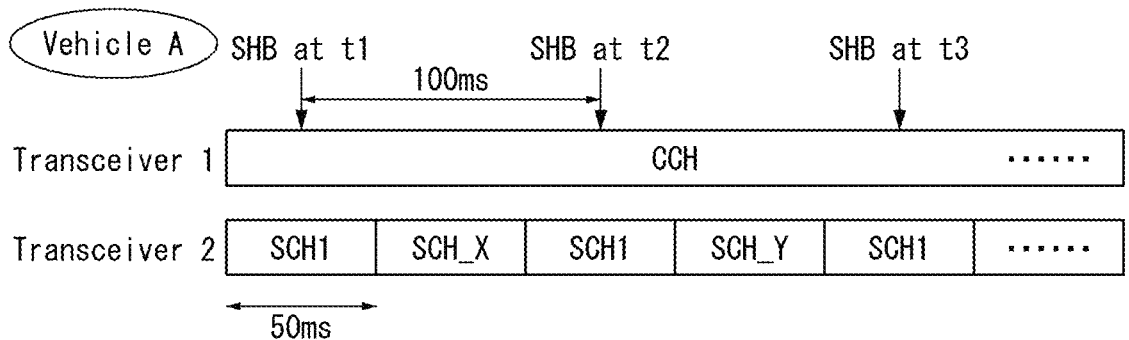
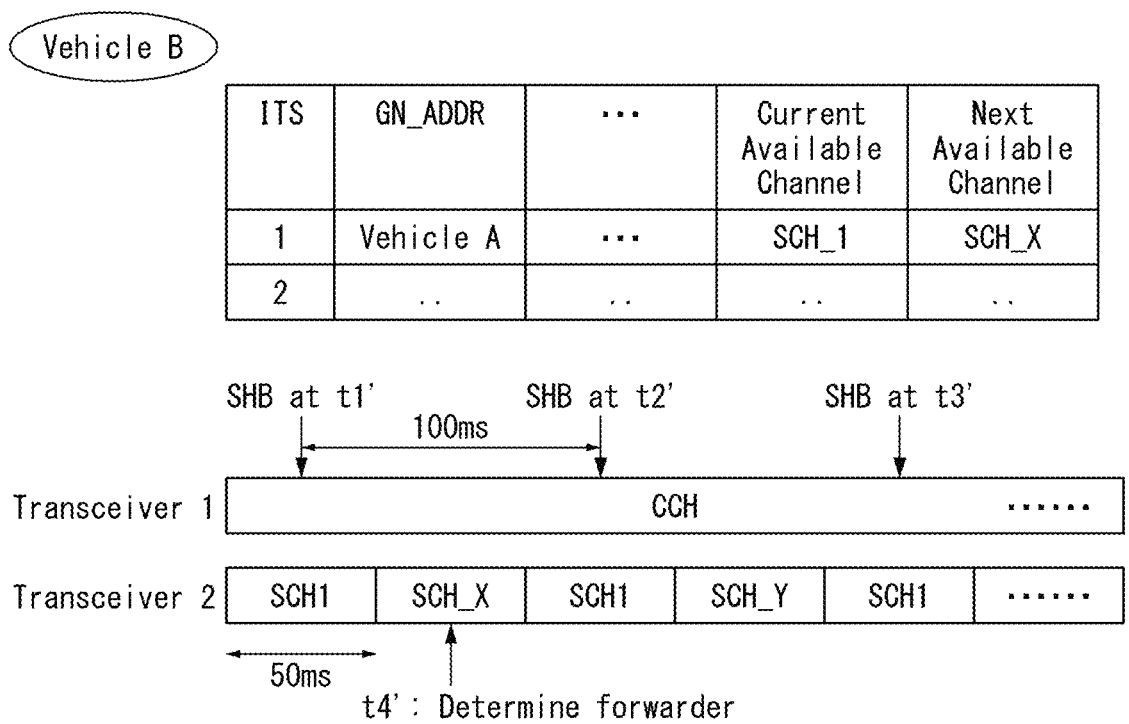

[Figure 21]
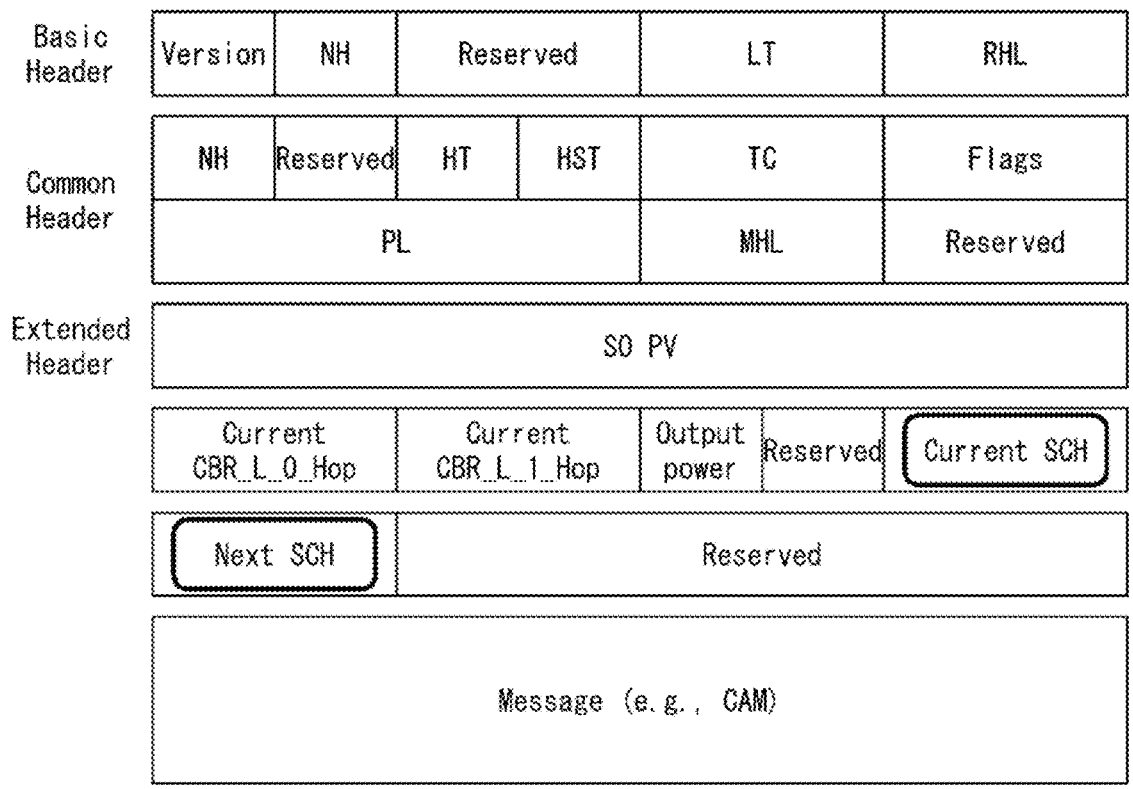

【Figure 22】
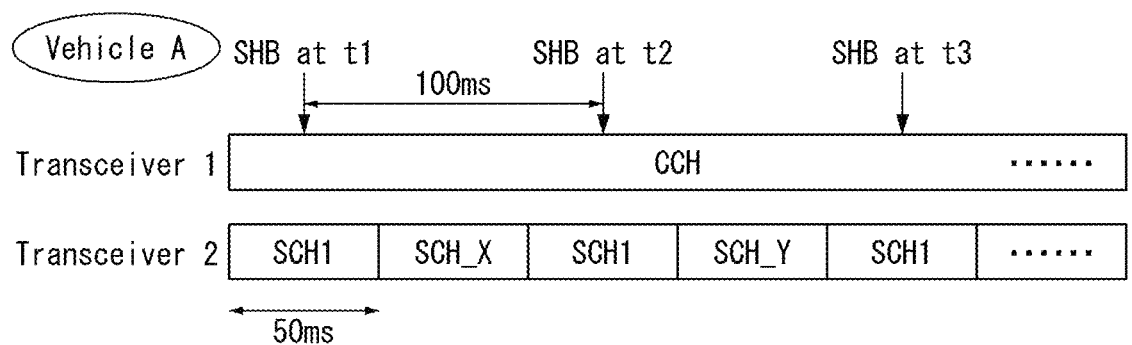
【Figure 23】
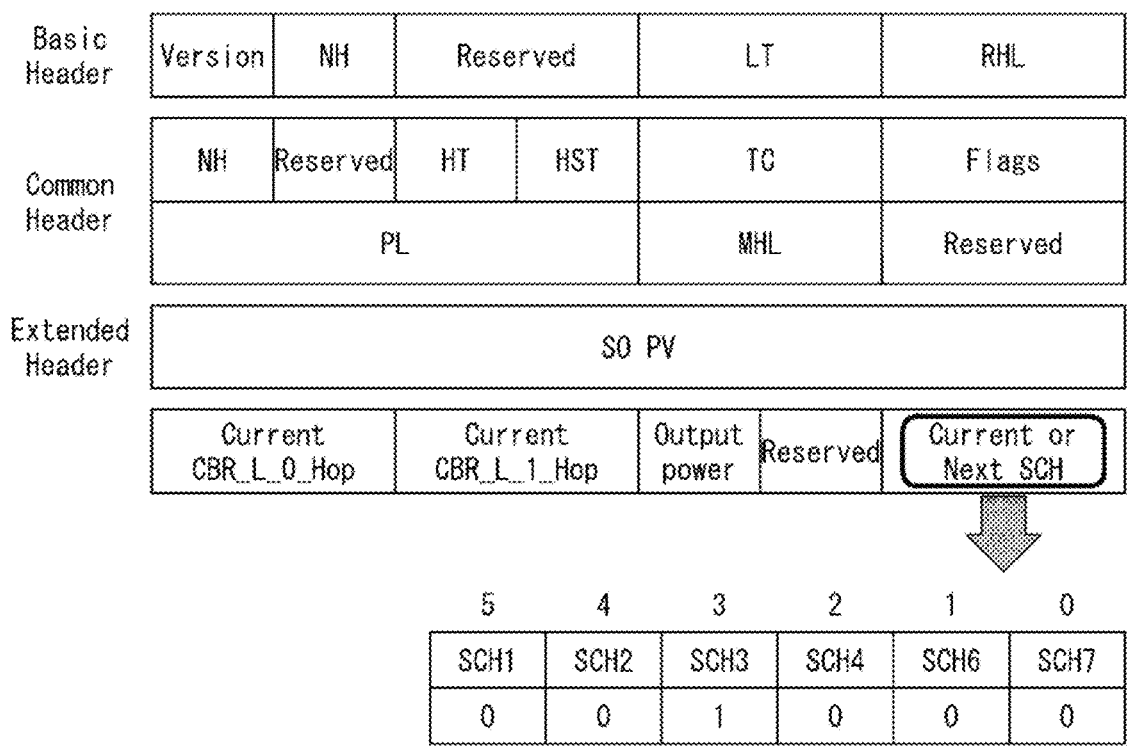

[Figure 24]
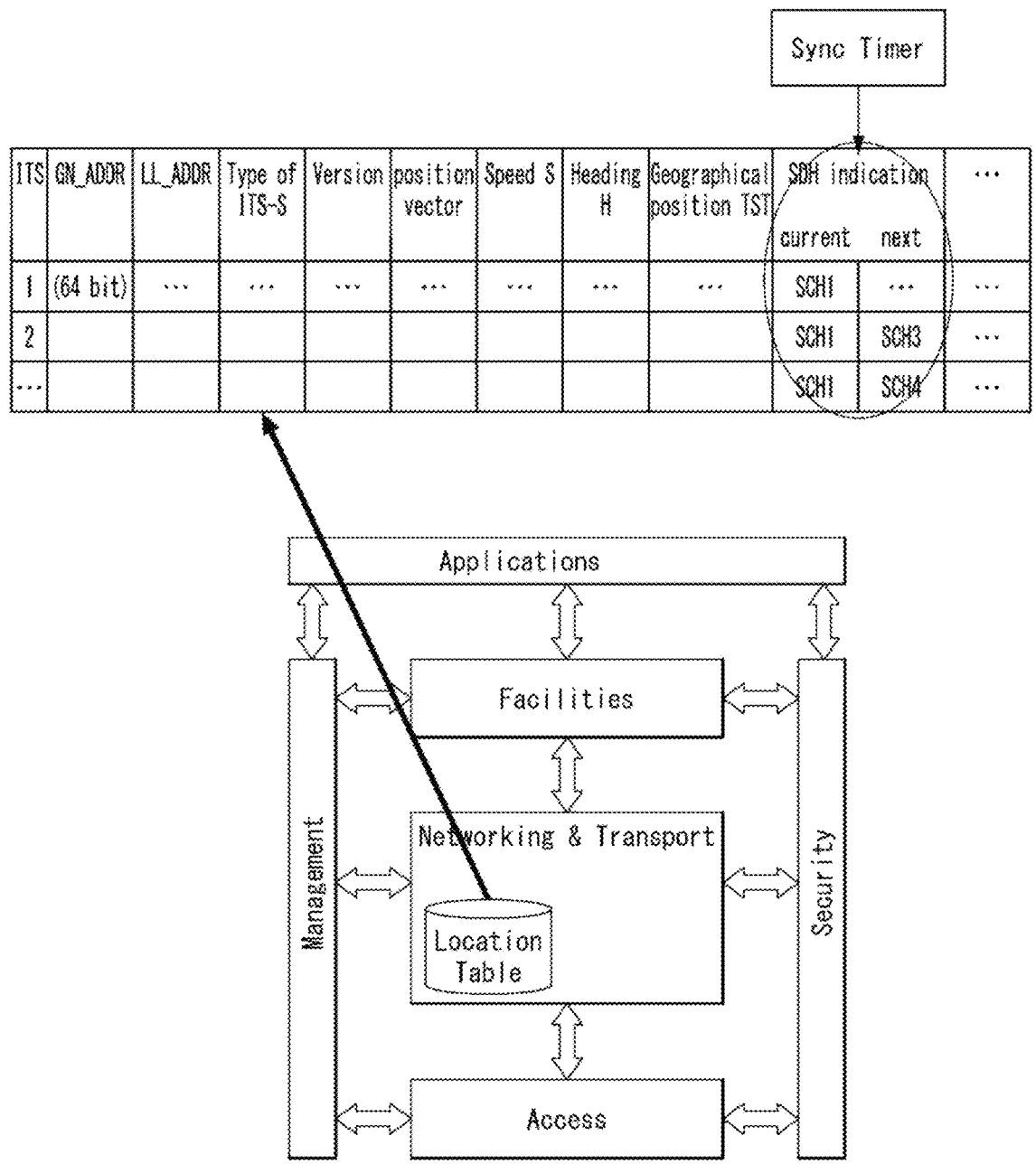

[Figure 25]
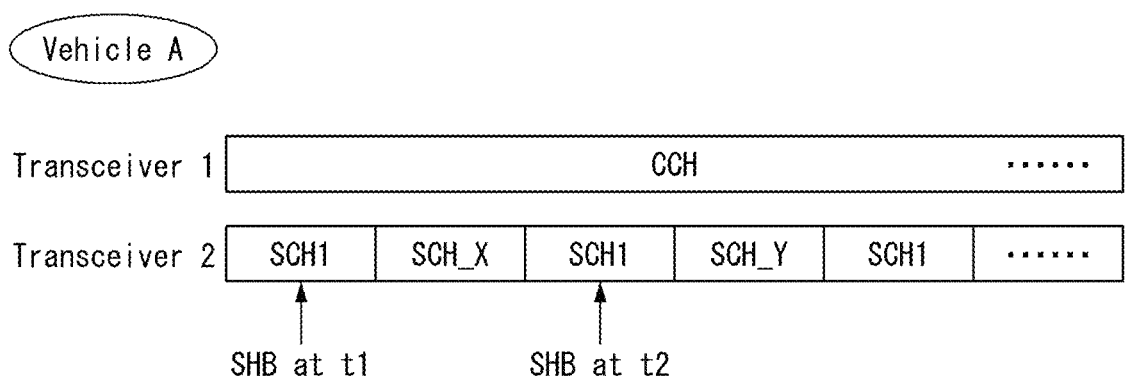

[Figure 26]

```
1    -- P is the GN packet to be forwarded
2    -- i is the i - th LocTE
3    -- NH is the LocTE idenfified as next hop, NH_LL_ADDR its link layer address
4    -- NH_LL_ADDR is the link layer address of the next hop
5    -- EPV is the ego position vector
6    -- PV_P is the destination position vector in the GeoNetworking packet to be forwarded
7    -- PV_I is the position vector of the i - th LocTE
8    -- MFR indicates the progress according to the MFR policy
9    -- B is the forwarding packet buffer
10        (UC forwarding buffer or BC forwarding buffer, depending on type of P)
11   -- TC is the traffic class of the GN - Data.request (source operations)
12       or the field in the received Common header (forwarder operations)
13   MFR = DIST(PV_P , EPV)                          Initialize MFR
14   FOR (i LocT)
15       IF (i.IS_NEIGHBOUR) THEN                    # LocTE i is neighbour
16           IF (DIST(PV_P, PV_I) < MFR) THEN
17               NH  <- i
18               MFR <- DIST(PV_P, PV_I)
19           ENDIF
20       ENDIF
21   ENDFOR
22   IF (MFR < DIST(PV_P, EPV)) THEN
23       SET NH_LL_ADDR  <- NH.LL_ADDR
24   ELSE                                            # Forwarder is at a local optimum
25       IF (TC.SCF_IS_ENABLED) THEN
26           ADD P TO B
27           SET NH_LL_ADDR <- 0                     # Indicates that packet is buffered
28       ELSE
29           SET NH_LL_ADDR <- BCAST                 # No buffering allowed, fall back to BCAST
30       ENDIF
31   ENDIF
32   RETURN NH_LL_ADDR
```

[Figure 27]
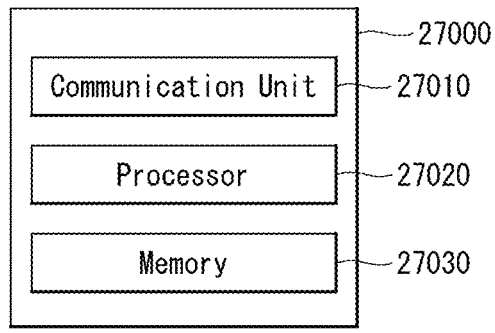
[Figure 28]
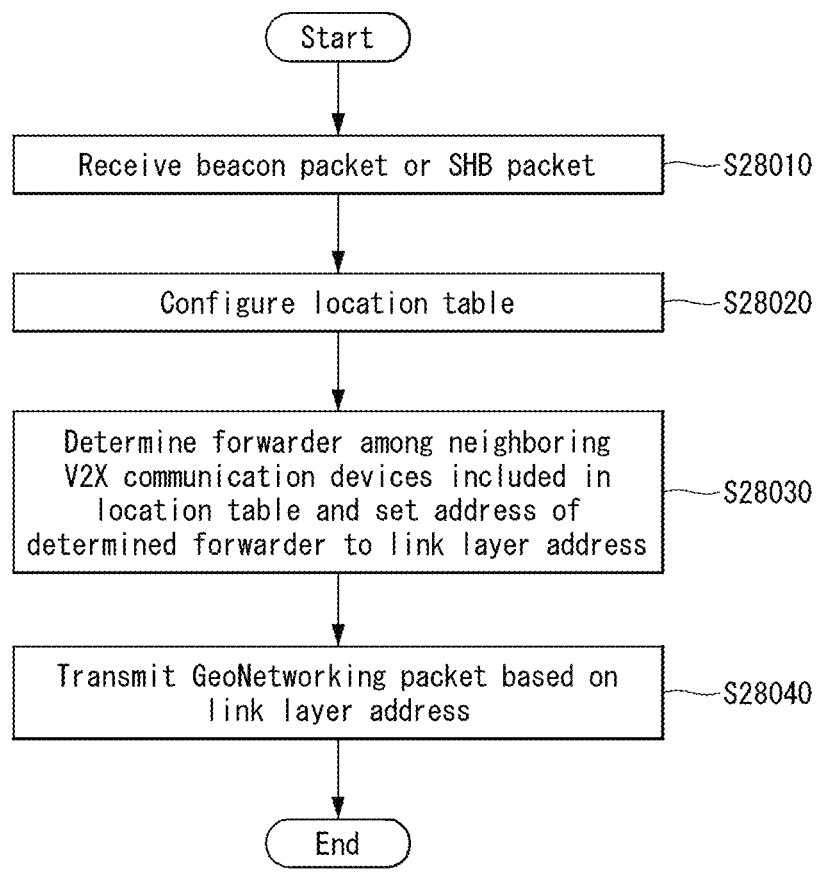

V2X COMMUNICATION DEVICE AND GEO-NETWORKING TRANSMISSION METHOD

CROSS-REFERENCE TO RELATED APPLICATIONS

This application is the National Stage filing under 35 U.S.C. 371 of International Application No. PCT/KR2017/011168, filed on Oct. 11, 2017, which claims the benefit of U.S. Provisional Application No. 62/524,589, filed on Jun. 25, 2017, the contents of which are all hereby incorporated by reference herein in their entirety.

TECHNICAL FIELD

The present disclosure relates to a device for V2X communication and a GeoNetworking transmission method thereof, and more particularly to a forwarding algorithm capable of reliably forwarding data out of a transmission range.

BACKGROUND ART

Recently, vehicles are becoming a product of complex industrial technology, in which electrical, electronic and communication technologies are fused, centering on mechanical engineering. In this respect, vehicles are also called smart cars. Smart cars are providing various customized mobile services, as well as traditional vehicle technologies such as traffic safety/congestion settlement by connecting drivers, vehicles, and transportation infrastructures. This connectivity may be implemented using a Vehicle to Everything (V2X) communication technology.

DISCLOSURE

Technical Problem

Various services can be provided through V2X communication. Furthermore, a plurality of frequency bands was used to provide the various services. Even in such an environment, highly reliable forwarding and providing of safety services are very important matters considering characteristics of vehicle communication.

In the V2X communication, a GeoNetworking transmission method using hopping can be used to transmit data out of the transmission range. In GeoNetworking transmission, a packet forwarding algorithm can be used for data hopping and destination forwarding. In particular, in a V2X communication environment in which a communication environment changes dynamically, efficiency and reliability should be considered for the packet forwarding algorithm.

Technical Solution

In order to solve the above-described and other technical problems, in one aspect, there is provided a GeoNetworking transmission method of a V2X communication device, the method comprising receiving a beacon packet or a single hop broadcast (SHB) packet; configuring location information, the location information including information about at least one neighboring V2X communication device executing a GeoNetworking protocol; determining a forwarder from the neighboring V2X communication devices included in a location table and setting an address of the determined forwarder to a link layer address; and transmitting a GeoNetworking packet to a first service channel (SCH) based on the link layer address.

A header of the beacon packet or the SHB packet may include SCH information for a multi-channel operation (MCO).

The SCH information may indicate at least one of a current SCH ID or a next SCH ID that is accessed by the neighboring V2X communication device transmitting the beacon packet or the SCH packet.

The location information may include at least one of GeoNetworking address information, link layer address information, type information, position vector information, or the SCH information about at least one neighboring V2X communication device receiving the GeoNetworking packet.

The determining of the forwarder may further comprise determining, as the forwarder, one of one or more V2X communication devices using the first SCH among the neighboring V2X communication devices.

The beacon packet or the SHB packet including the SCH information may be received on a control channel (CCH) or a SCH.

When the beacon packet or the SHB packet including the SCH information is received on a specific SCH, the SCH information may indicate an ID of other SCH other than the specific SCH.

In another aspect, there is provided a V2X communication device comprising a memory configured to store data; a communication unit configured to transmit and receive a radio signal including a GeoNetworking packet; and a processor configured to control the memory and the communication unit. The processor may be configured to receive a beacon packet or a single hop broadcast (SHB) packet, configure location information, the location information including information about at least one neighboring V2X communication device executing a GeoNetworking protocol, determine a forwarder from the neighboring V2X communication devices included in a location table and set an address of the determined forwarder to a link layer address, and transmit the GeoNetworking packet to a first service channel (SCH) based on the link layer address.

Advantageous Effects

The present disclosure can improve channel usage efficiency by a multi-channel operation. Further, the present disclosure can improve a packet forwarding probability upon GeoNetworking transmission by transmitting and receiving service channel information used according to the multi-channel operation. Additional and various other effects of the present disclosure are described along with the configuration of the present disclosure.

DESCRIPTION OF DRAWINGS

The accompanying drawings, that are included to provide a further understanding of the present disclosure and are incorporated in and constitute a part of this specification, illustrate embodiments of the present disclosure and together with the description serve to explain various principles of the present disclosure.

FIG. 1 illustrates a protocol structure of an ITS system according to an embodiment of the present disclosure.

FIG. 2 illustrates a packet structure of a networking/transport layer according to an embodiment of the present disclosure.

FIG. 3 illustrates configuration of a basic header and a common header, as a header structure of a GeoNetworking packet according to an embodiment of the present disclosure.

FIG. 4 illustrates a GeoNetworking method of geographically-scoped unicast (GUC) type according to an embodiment of the present disclosure and a GUC packet header configuration according to the method.

FIG. 5 illustrates a GeoNetworking method of topologically scoped broadcast (TSB) type according to another embodiment of the present disclosure and a TSB packet header configuration according to the method.

FIG. 6 illustrates a GeoNetworking method of single hop broadcast (SHB) type and a SHB packet header configuration according to another embodiment of the present disclosure.

FIG. 7 illustrates a GeoNetworking method of geographically-scoped broadcast (GBC)/geographically-scoped anycast (GAC) type and a GBC/GAC packet header configuration according to another embodiment of the present disclosure.

FIG. 8 illustrates a beacon type GeoNetworking according to another embodiment of the present disclosure and a beacon packet header configuration according to this.

FIG. 9 illustrates configuration of a location service (LS) request packet header and a LS reply packet header according to an embodiment of the present disclosure.

FIG. 10 illustrates position vector information according to an embodiment of the present disclosure.

FIG. 11 illustrates a packet forwarding method of a greedy forwarding algorithm according to an embodiment of the present disclosure.

FIG. 12 illustrates a packet forwarding method of a non-area contention-based algorithm according to an embodiment of the present disclosure.

FIG. 13 illustrates a packet forwarding method of an area contention-based algorithm according to an embodiment of the present disclosure.

FIG. 14 illustrates multi-channel allocation used in an ITS system operation according to an embodiment of the present disclosure.

FIG. 15 illustrates a multi-channel operation (MCO) method of a V2X communication device according to an embodiment of the present disclosure.

FIG. 16 illustrates a communication situation in MCO according to an embodiment of the present disclosure.

FIG. 17 illustrates a communication environment of ITS-Ss (ITS stations) according to an embodiment of the present disclosure.

FIG. 18 illustrates a SHB transmission cycle and a channel switching cycle of an ITS-S according to an embodiment of the present disclosure.

FIG. 19 illustrates a packet header structure including SCH information according to an embodiment of the present disclosure.

FIG. 20 illustrates a SHB transmission cycle and a channel switching cycle of an ITS-S according to another embodiment of the present disclosure.

FIG. 21 illustrates a packet header structure including SCH information according to another embodiment of the present disclosure.

FIG. 22 illustrates a SHB transmission cycle and a channel switching cycle of an ITS-S according to another embodiment of the present disclosure.

FIG. 23 illustrates a packet header structure including SCH information according to another embodiment of the present disclosure.

FIG. 24 illustrates a location table update method of an ITS-S according to an embodiment of the present disclosure.

FIG. 25 illustrates a packet header structure including SCH information according to another embodiment of the present disclosure.

FIG. 26 illustrates a pseudo-code of a greedy forwarding algorithm according to an embodiment of the present disclosure.

FIG. 27 illustrates configuration of a V2X communication device according to an embodiment of the present disclosure.

FIG. 28 is a flow chart illustrating a GeoNetworking transmission method according to an embodiment of the present disclosure.

BEST MODE

Preferred embodiments of the present disclosure will be described in detail with reference to the accompanying drawings. The following detailed description with reference to the accompanying drawings is to illustrate preferred embodiments of the present disclosure rather than illustrate only embodiments that can be implemented according to embodiments of the present disclosure. The following detailed description includes details in order to provide the full understanding of the present disclosure, but the present disclosure does not require all of these details. The following embodiments of the present disclosure do not need to be separately used. A plurality of embodiments or all embodiments may be together used, and specific embodiments may be used in combination with each other.

Most of the terms used in the present disclosure are selected from common ones widely used in the corresponding field, but some terms are arbitrarily selected by the applicant and the meaning thereof will be described in detail in the following description as necessary. Therefore, the present disclosure should be understood based on the intended meanings of the terms rather than the simple names or meanings of the terms.

The present disclosure relates to a V2X communication device. The V2X communication device is included in an intelligent transport system (ITS) and may perform some or all of functions of the ITS system. The V2X communication device may perform communication between a vehicle and a vehicle, a vehicle and infrastructure, a vehicle and a bicycle, a vehicle and a mobile device, etc. The V2X communication device may be abbreviated to a V2X device. In one embodiment, the V2X device may correspond to an on-board unit (OBU) of a vehicle or may be included in the OBU. The OBU may be referred to as an on-board equipment (OBE). The V2X communication device may correspond to a road side unit (RSU) of infrastructure or may be included in an RSU. The RSU may be referred to as a road side equipment (RSE). Alternatively, the V2X communication device may correspond to an ITS station (ITS-S) or may be included in the ITS station. All of given OBU, RSU, mobile equipment, etc, that perform V2X communication may be referred to as the ITS station or the V2X communication device. In GeoNetworking communication, the V2X communication device may be referred to as a router.

The V2X communication device may communicate based on various communication protocols. The V2X communication device may implement wireless access in vehicular environments (WAVE) protocol of IEEE 1609.1-4. In this case, the V2X communication device may be referred to as a WAVE device or a WAVE communication device.

The V2X communication device may send a cooperative awareness message (CAM) or a decentralized environmental notification message (DENM). The CAM is distributed in an ITS network and provides information about at least one of a presence, a position, a communication state, or an operation state of the ITS station. The DENM provides information on a detected event. The DENM may provide information about any driving situation or an event detected by the ITS station. For example, the DENM may provide information about situations such as an emergency electronic brake lamp, a vehicle accident, a vehicle problem, a traffic condition, and the like.

FIG. 1 illustrates a protocol structure of an ITS system according to an embodiment of the present disclosure.

Application layer: the application layer may implement and support various use cases. For example, an application may provide road safety, efficient traffic information, and other application information.

Facilities layer: the facilities layer may support to effectively implement the various use cases defined in the application layer. For example, the facilities layer may perform application support, information support, and session/communication support.

Access layer: the access layer may transmit the message/data received at the upper layers through a physical channel. For example, the access layer may perform/support data communication based on an IEEE 802.11 and/or 802.11p standards-based communication technology, an ITS-G5 wireless communication technology based on a physical transmission technology of the IEEE 802.11 and/or 802.11p standards, a 2G/3G/4G(LTE)/5G wireless cellular communication technology including satellite/broadband wireless mobile communication, a broadband terrestrial digital broadcasting technology such as DVB-T/T2/ATSC, a GPS technology, an IEEE 1609 WAVE technology, and the like.

Networking and transport layer: the networking/transport layer may configure a network for vehicle communication between homogenous/heterogeneous networks by using various transport protocols and networking protocols.

The transport layer is a connection layer between services provided by the upper layers (session layer, presentation layer, and application layer) and the lower layers (networking layer, data link layer, and physical layer). The transport layer may manage transmitted data to exactly arrive at a destination. At the transmitting side, the transport layer may process data into packets of an appropriate size for efficient data transmission, and at the receiving side, the transport layer may perform processing to recover the received packets to an original file. In an embodiment, protocols such as transmission control protocol (TCP), user datagram protocol (UDP), and basic transport protocol (BTP) may be used as a transport protocol.

The network layer may manage a logical address and may determine a delivery path of the packet. The network layer may receive the packet generated in the transport layer and may add the logical address of the destination to a network layer header. In an embodiment, the packet path may be considered for unicast/broadcast between vehicles, between vehicles and fixed stations, and between fixed stations. In an embodiment, GeoNetworking, IPv6 networking with mobility support, IPv6 over GeoNetworking, etc. may be considered as the networking protocol.

The ITS architecture may further include a management layer and a security layer.

FIG. 2 illustrates a packet structure of a networking/transport layer according to an embodiment of the present disclosure.

The transport layer may generate a BTP packet, and the network layer may encapsulate the BTP packet to generate a GeoNetworking packet. The GeoNetworking packet may be encapsulated into an LLC packet. In the embodiment of FIG. 2, data may include a message set, and the message set may be a basic safety message.

BTP is a protocol for sending a message such as a CAM and a DENM generated in the facilities layer to the lower layer. A BTP header consists of A type and B type. The A type BTP header may include a destination/destination port and a source port which are necessary for transmission/reception in interactive packet transmission. The B type BTP header may include a destination port and destination port information which are necessary for transmission in non-interactive packet transmission. A description of fields/information included in the header is as follows.

Destination Port: the destination port identifies a facility entity corresponding to a destination of data (BTP-PDU) included in the BTP packet.

Source Port: as a field generated in the case of the BTP-A type, the sound port indicates a port of a protocol entity of the facilities layer at a source to which the corresponding packet is transmitted. This field may have a size of 16 bits.

Destination Port Info: as a field generated in the case of the BTP-B type, the destination port info may provide additional information when the destination port is the most well-known port. This field may have a size of 16 bits.

The GeoNetworking packet includes a basic header and a common header according to the protocol of the network layer and optionally includes an extension header according to a GeoNetworking mode. The GeoNetworking header will be again described below.

An LLC header is added to the GeoNetworking packet to generate an LLC packet. The LLC header provides a function of distinguishing and transmitting IP data and GeoNetworking data. The IP data and the GeoNetworking data may be distinguished by EtherType of SNAP. In an embodiment, when IP data is transmitted, the EtherType may be set to 0x86DD and included in the LLC header. In an embodiment, when GeoNetworking data is transmitted, the EtherType may be set to 0x86DC and included in the LLC header. A receiver may check the EtherType field of the LLC packet header and may forward and process the packet to the IP data path or the GeoNetworking path according to the value of the EtherType field of the LLC packet header.

FIG. 3 illustrates configuration of a basic header and a common header, as a header structure of a GeoNetworking packet according to an embodiment of the present disclosure.

FIG. 3(a) illustrates a basic header of a GeoNetworking packet header illustrated in FIG. 2, and FIG. 3(b) illustrates a common header of a GeoNetworking packet header illustrated in FIG. 2.

The basic header may be 32 bits (4 bytes). The basic header may include at least one of a version field, a next header (NH) field, a lifetime (LT) field, and a remaining hop limit (RHL) field. The fields included in the basic header are described as follows. A bit size constituting each field is merely an example, and can be changed.

Version (4 bits): the version field indicates a version of the GeoNetworking protocol.

NH (4 bits): the next header (NH) field indicates types of subsequent headers/fields. The common header may follow if a field value is 1, and a secured packet in which the security is configured may follow if the field value is 2.

LT (8 bits): the lifetime (LT) field indicates a maximum lifetime of the corresponding packet.

RHL (8 bits): the remaining hop limit (RHL) field indicates a remaining hop limit. An RHL field value may be reduced by one each time a GeoAdhoc router forwards the packet. If the RHL field value is 0, the corresponding packet is no longer forwarded.

The common header may be 64 bits (8 bytes). The common header may include at least one of a next header (NH) field, a header type (HT) field, a header sub-type (HST) field, a traffic class (TC) field, a flags field, a payload length (PL) field, and a maximum hop limit (MHL) field. Each field is described as follows.

NH (4 bits): the next header (NH) field indicates types of subsequent headers/fields. The NH field may indicate an undefined "ANY" type if the field value is 0, indicate a BTP-A type packet if the field value is 1, indicate a BTP-B type packet if the field value is 2, and indicate an IP diagram of IPv6 if the field value is 3.

HT (4 bits): the header type field indicates a GeoNetworking type. The GeoNetworking type includes Beacon, GeoUnicast, GeoAnycast, GeoBroadcast, topologically-scoped broadcast (TSB), and location service (LS).

HST (4 bits): the header sub-type field indicates a detailed type together with the header type. In an embodiment, when the HT type is set to the TSB, the HST may indicate a single hop if the HST value is '0', and indicate a multi-hop if the HST value is '1'.

TC (8 bits): the traffic class field may include store-carry-forward (SCF), channel offload, and TC ID. The SCF field indicates whether to store the packet when there is no neighbor to which the packet is to be forwarded. The channel offload field indicates that the packet can be forwarded to another channel in a multi-channel operation. The TC ID field is a value allocated when forwarding the packet in the facilities layer and may be used to set a contention window value in the physical layer.

Flag (8 bits): the flag field indicates whether the ITS device is mobile or stationary, and may become last 1 bit in an embodiment.

PL (8 bits): the payload length field indicates a data length subsequent to the GeoNetworking header in units of bytes. For example, in the GeoNetworking packet that carries the CAM, the PL field may indicate the lengths of the BTP header and the CAM.

MHL (8 bits): the maximum hop limit (MHL) field may indicate a maximum hopping number.

The GeoNetworking header includes the basic header and the common header described above, and an extended header. A configuration of the extended header varies depending on a type of the GeoNetworking. A header configuration depending on each type of the GeoNetworking is described below.

In the present disclosure, a V2X communication device that performs the GeoNetworking may be referred to as a router or a GeoAdhoc router. A V2X communication device that sends a GeoNetworking packet may be referred to as a source router or a sender. A V2X communication device that receives the GeoNetworking packet from the source router and relays/forwards it to the sender may be referred to as a forwarding router or a forwarder. In addition, a V2X communication device that is a final destination of the GeoNetworking packet or a V2X communication device of a final destination area may be referred to as a destination or a destination router.

FIG. 4 illustrates a GeoNetworking method of geographically-scoped unicast (GUC) type according to an embodiment of the present disclosure and a GUC packet header configuration according to the method.

FIG. 4(a) illustrates a data forwarding method of geographically-scoped unicast (GUC) type, and FIG. 4(b) illustrates a GUC header configuration.

GUC is a method for forwarding data from a specific source router to a destination router. As illustrated in FIG. 4(a), a source router S may transmit data to a destination router N8 with GUC type via a multi-hop. The source router has to have information about the destination router in a location table. When that there is no information about the destination router, the source router may find a desired destination by using "LS request and LS reply" process.

In FIG. 4(b), a GUC packet header includes a basic header, a common header, and an extended header. A HT field of the common header indicates the GUC, and the extended header includes a SN field, a source position vector (SO PV) field, and a destination position vector (DE PV) field. The description for the fields included is as below.

Sequence Number (SN): the sequence number field indicates a value used for examining a packet redundancy. A value of the sequence number field is increased by 1 when the source transmits the packet. A reception router may use the sequence number (or sequence number and TST value) to determine whether a packet is redundantly received. The SN is a value used in multi-hop transmission.

SO PV: the SO PV represents a position of source and may be a long position vector format.

DE PV: the DE PV represents a position of destination and may be a short position vector format.

FIG. 5 illustrates a GeoNetworking method of topologically scoped broadcast (TSB) type according to another embodiment of the present disclosure and a TSB packet header configuration according to the method.

FIG. 5(a) illustrates a data forwarding method of topologically scoped broadcast (TSB) type, and FIG. 5(b) illustrates a TSB header configuration.

TSB is a broadcast scheme in which a distance of data forwarding is adjusted by the number of hops. Information based on a position is not used. Since it is determined whether data is forwarded using only the number of hops, a position address of destination or local information to which data is forwarded is not used. Data may be forwarded to all routers within n hops from the source router S.

FIG. 5(a) illustrates a data transmission of TSB scheme of n-2. The source router may broadcast a signal by setting n=2, and the routers within a transmission range of the source router receive the signal. Since n=2, forwarding routers N1, N2 and N3 that receive data with 1 hop re-broadcast a reception packet. Since n=2, the routers receiving the re-broadcasted signal do not re-broadcast the reception packet. In the TSB transmission method, the case of single hop (n=1) may be referred to single hop broadcast (SHB).

In FIG. 5(b), a TSB packet header includes a basic header, a common header, and an extended header. A HT field of the common header indicates the TSB, and the extended header includes a SN field and a source position vector (SO PV) field. The description for the fields included is as below.

Sequence Number (SN): the sequence number field indicates a value used for examining a packet redundancy. A value of the sequence number field is increased by 1 when the source transmits the packet. A reception router may use the sequence number (or sequence number and TST value) to determine whether a packet is redundantly received. The SN is a value used in multi-hop transmission.

SO PV: the SO PV represents a position of source and may be a long position vector format.

In the TSB header, since the number of transmissions is limited by the number of hops, a destination address may be omitted.

FIG. 6 illustrates a GeoNetworking method of single hop broadcast (SHB) type and a SHB packet header configuration according to another embodiment of the present disclosure.

FIG. 6(a) illustrates a data forwarding method of single hop broadcast (SHB) type, and FIG. 6(b) illustrates a SHB header configuration.

SHB corresponds to the case where the number of hops is 1 (n=1) in the above-described TSB. A SHB packet is transmitted only to routers within a transmission range of a source router. Since data can be transmitted with a minimum latency, the SHB may be used to send a safe massage such as a CAM. As illustrated in FIG. 6(a), a packet is transmitted only to the routers N1, N2 and N3 of the source S within the range of 1 hop.

In FIG. 6(b), a SHB packet header includes a basic header, a common header, and an extended header. A HT field of the common header indicates the TSB, and the extended header includes a source position vector (SO PV) field. The description for the field included is as below.

SO PV: the SO PV represents a position of source and may be a long position vector format.

In the SHB packet, since the number of transmissions is limited by the number of hops, a destination address may be omitted. Since the multi-hop transmission is not performed, an SN field for redundancy examination may also be omitted.

FIG. 7 illustrates a GeoNetworking method of geographically-scoped broadcast (GBC)/geographically-scoped anycast (GAC) type and a GBC/GAC packet header configuration according to another embodiment of the present disclosure.

FIG. 7(a) illustrates a data forwarding method of geographically-scoped broadcast (GBC)/geographically-scoped anycast (GAC) type, and FIG. 7(b) illustrates a GBC/GAC header configuration.

GeoBroadcast/GBC is a transmission scheme that broadcasts a packet to all routers of a specific area, and GeoAnycast/GAC is a transmission scheme that transmits a packet only to one router that first receives a packet in a specific area. In the GBC, when data forwarded from a source router is forwarded to a specific destination area, a packet is broadcasted within a fixed area. In the GAC, when a packet is forwarded to one router in a specific destination area, the packet is no longer transmitted.

In FIG. 7(b), a GBC/GAC header includes a basic header, a common header, and an extended header. A HT field of the common header indicates the GBC or the GAC, and the extended header includes a SN field, a source position vector (SO PV) field, and destination area information. The destination area information includes a latitude (GeoAreaPosLatitude) field of the center of a destination area, a longitude (GeoAreaPosLongitude) field, and distance fields (Distances a, b) and an angle field for informing about a range of the area.

Sequence Number (SN): the Sequence Number field indicates a value used for examining a packet redundancy. A value of the sequence number field is increased by 1 when the source transmits the packet. A reception router may use the sequence number (or sequence number and TST value) to determine whether a packet is redundantly received. The SN is a value used in multi-hop transmission.

SO PV: the SO PV represents a position of source and may be a long position vector format.

DE PV: the DE PV represents a position of destination and may be a short position vector format.

FIG. 8 illustrates a beacon type GeoNetworking according to another embodiment of the present disclosure and a beacon packet header configuration according to this.

FIG. 8 illustrates a header configuration of a beacon packet. The beacon packet header may include a basic header, a common header, and an extended header, and the extended header may include SO PV information.

The beacon packet may be configured similar to the SHB packet header described above. A difference is that the SHB packet is used to forward data such as a CAM because a message can be added behind, while data is not added to the beacon packet, and the beacon packet header itself is used. The CAM or the beacon using the SHB may be sent periodically. By sending and receiving the CAM or the beacon, a router can obtain position information of neighboring routers and perform routing using the position information. In an embodiment, if the CAM is sent, the beacon may not be sent.

FIG. 9 illustrates configuration of a location service (LS) request packet header and a LS reply packet header according to an embodiment of the present disclosure.

FIG. 9(a) illustrates a LS request packet header, and FIG. 9(b) illustrates a LS reply packet header.

When there is no destination information in a location table of a source router, the source router may request GeoNetworking address information GN_ADDR on a destination from the surrounding. This address information request may be performed such that a LS request packet transmits LS request information LS_request. When the information requested by the source router is included in a location table of a router receiving the LS request packet, the corresponding router may transmit LS reply information LS_reply. In addition, the router of the destination may transmit the LS reply information in response to the LS request information.

The LS reply information includes position vector information of the GN_ADDR. The source router may update the location table through the LS reply information. The source router may perform GUC transmission by using the GeoNetworking address information that is received as a reply.

In FIG. 9(a), a configuration of the LS request packet header is similar to the GUC header. In the LS request packet header, a GeoNetworking address request field RequestGN_ADDR is included, instead of the destination address field of the GUC header.

In FIG. 9(b), a configuration of the LS reply packet header is the same as the GUC packet header. However, the SO PV field includes position vector information of the router, and the DE PV field includes position vector information of the router that transmits the request.

FIG. 10 illustrates position vector information according to an embodiment of the present disclosure.

As described above, the GeoNetworking packet header includes a position vector (PV) field related to a position. A type of the position vector includes a long PV and a short PV. FIG. 10(a) illustrates long position vector information, and FIG. 10(b) illustrates short position vector information.

As illustrated in FIG. 10(a), the long position vector information includes subfields as follows.

GN_ADDR: the GeoNetworking address field may consist of total of 64 bits. The GeoAdhoc router performing GeoNetworking transmission has one single GeoNetworking address value. The GeoNetworking address field may include the following subfields.

a) M: field for distinguishing whether it is the GeoNetworking address value or a manually set value. In an embodiment, if the value is '1', it may be the manually set value.

b) ST: ITS-S type field indicates a type of the ITS station. The ITS-S type may include a pedestrian, a cyclist, a moped, a motorcycle, a passenger car, a bus, a light truck, a heavy truck, a trailer, a special vehicle, a tram, and an RSU.

c) MID: as V2X device identification information, a MAC address may be used.

TimeSTamp (TST): the time stamp field indicates a time at which the ITS station obtains the latitude/longitude value in the GeoAdhoc router. The TST is in units of milliseconds, and may use a universal time coordinated (UTC) value.

Latitude (LAT), Longitude (Long): the latitude field and the longitude field indicate a latitude value and a longitude value of the GeoAdhoc router.

Position Accuracy Indicator (PAI): it indicates an accuracy of the position of the GeoAdhoc router.

Speed (S): it indicates a speed of the GeoAdhoc router.

Heading (H): it indicates a direction of the GeoAdhoc router.

As illustrated in FIG. 10(b), the shot position vector information includes a GN_ADDR field, a TST field, a LAT field, and a Long field. The description for each field of the shot position vector information is the same as the above description for the long position vector information.

Various packet forwarding methods may be used for GeoNetworking transmission. For example, a greedy forwarding algorithm, a contention-based forwarding algorithm, a non-area contention-based forwarding algorithm, an area contention-based forwarding algorithm, an area advanced forwarding algorithm, etc. may be used. The forwarding algorithm is used for efficiently forwarding and distributing data to a desired area. The greedy forwarding algorithm is such that a source router determines a forwarding router, and the contention-based forwarding algorithm is such that a reception router determines whether to forward a packet using contention. Hereinafter, a V2X device/router processing a GeoNetworking algorithm may be referred to as an ego-router.

In the GeoNetworking, each V2X device may perform a router function and use an ad hoc method for determining routing of packets. Each V2X device may transmit position information, speed information, and heading information of the vehicle to the surroundings, and determine the routing of packets using the information. The periodically received information is stored in a location table (LocT) of the networking & transport layer, and the stored information may be timed out after a predetermined time passed. The LocT may be stored in a location table entry (LocTE).

For the GeoNetworking protocol operation, each ad hoc router should have information about another ad hoc router. Information on neighboring routers may be received through the SHB or the beacon packet. The router may update the LocT when new information is received. A transmission cycle of the SHB or beacon packet may change depending on the channel state. The location/location table may be referred to as LocT.

The information on the neighboring routers is stored in the LocT, and the stored information may include at least one of the following information. The information stored in the LocT may be deleted from the list when the lifetime set to soft-state expires.

GN_ADDR: GeoNetworking address of the ITS station

Type of ITS-S: type of the ITS station, for example, indicating whether it is a vehicle or an RSU.

Version: GeoNetworking version used for the ITS station

Position vector PV: position vector information may include at least one of geographical position information, speed information, heading information, time stamp information indicating a time of measurement of position information, and position accuracy indicator (PAI) information indicating the accuracy of the provided position.

Flag LS_PENDING (LS_PENDING flag): flag indicating when a location service request proceeds because a current LocT does not have an address for a destination FLAG IS_NEIGHBOUR (IS_NEIGHBOUR flag): flag indicating whether there is a GeoAdhoc router that can communicate within the communication range DPL: duplicate packet list for source GN_ADDR Type Stamp: timestamp of the last packet indicating an end of duplication Packet Data Rate (PDR): packet transmission rate that the GeoAdhoc router should maintain FIG. 11 illustrates a packet forwarding method of a greedy forwarding algorithm according to an embodiment of the present disclosure.

The greedy forwarding algorithm determines that a sender forwards a packet to which router among neighboring routers that the sender knows. A location table (LocT) of the sender may be updated to the latest value through periodically distributed SHB or beacon packet. The sender selects a router closest to a destination from the LocT, and hence the packet can be forwarded to the destination using the minimum number of hops.

In FIG. 11, there exist routers 1 to 5 within a communication range of a source router. The source router transmits the packet by setting a MAC address of the router 2 closest to the destination to a link layer destination address.

The greedy forwarding algorithm does not use buffering, and can quickly forward a packet to the destination as long as the connection between the routers is broken. However, if the connection between the routers is broken, i.e., if the router to transmit the next hop is out of the transmission range or disappears, the reliability may be reduced because the packet cannot be forwarded.

A packet forwarding method of the contention-based forwarding algorithm is described below.

Unlike the above-described greedy forwarding algorithm, the contention-based forwarding algorithm determines, based on the contention, whether a receiver forwards a packet. All the receivers receiving the packet broadcasted by a sender may be potential forwarders. The respective receivers individually set a timer depending on a distance, and the receiver, in which the timer expires, first forwards the packet. If the receiver does not receive the packet from other receivers until the timer expires, the receiver forwards the packet when the timer expires. If the receiver receives the packet before the timer expires, the receiver turns off its timer and does not forward the packet.

Unlike the greedy forwarding algorithm, the contention-based forwarding algorithm does not need to know a position of neighboring routers. Even if a SHB packet or a beacon packet is not transmitted periodically, i.e., even if there is no location table, packet forwarding may be performed. Because there exists a plurality of forwarder candidates, reliability can increase, and the possibility of packet forwarding to the destination can increase. However, because the packet forwarding requires a buffering time, latency may increase. Further, a buffer may be additionally used.

FIG. 12 illustrates a packet forwarding method of a non-area contention-based algorithm according to an embodiment of the present disclosure.

The non-area contention-based algorithm is used to forward a packet toward a destination. In FIG. 12, a source router S may broadcast the packet for the packet forwarding. Routers 1 to 5 within a communication range of the source router receive the packet. Only a router closest to the destination among the routers may be a forwarder candidate. In FIG. 12, the routers 1 to 3 may be the forwarder candidates.

The forwarder candidates may store the received packet in a contention-based forwarding (CBF) packet buffer and set a timer. The timer may be set to a small value as a distance between the forwarder candidate and the source router increases. In FIG. 12, a timer of the router 1 may be set to 25 ms, a timer of the router 2 may be set to 10 ms, and a timer of the router 3 may be set to 20 ms. The router, in which the timer ends, broadcasts the buffered packet.

The router 2, in which the timer first ends, broadcasts the packet. Each of the routers 1 and 3 receiving the packet broadcasted by the router 2 stops its timer and deletes the packet stored in the buffer. However, if the router 2 disappears or the routers 1 and 3 do not exist within a communication range of the router 2, the timers of the routers 1 and 3 are still effective. Thus, the router, in which the timer first becomes zero, broadcasts the packet.

FIG. 13 illustrates a packet forwarding method of an area contention-based algorithm according to an embodiment of the present disclosure.

The area contention-based forwarding algorithm aims to efficiently disseminate data in a predetermined area. Thus, there is no fixed destination, and timer setting may be determined considering only a distance between a router and a source router. The area contention-based forwarding algorithm proceeds when the router belongs to a specific area, and aims to quickly distribute/forward data in the corresponding area.

In FIG. 13, a packet broadcasted by a source router S is forwarded to routers 1 to 6. The router 2 farthest from the source router S first broadcast the packet, and the routers 1 and 3 receiving the packet stop their timers and do not forward the same packet. The routers 4 to 6 do not receive the packet broadcasted by the router 2. Thus, the routers 4 to 6 each run its timer and broadcast the received packet if the timer ends. If the router 5 forwards the packet, the router 4 receiving the packet ends its timer and removes the packet being ready for transmission from the buffer. The router 6, that does not receive the packet forwarded by other router, forwards the packet if its timer expires. In the area contention-based forwarding algorithm, the source router can quickly forward and share the packet in all the directions in the specific area.

The area advanced forwarding algorithm may be additionally used in the embodiment illustrated in FIGS. 12 and 13. The area advanced forwarding algorithm is an algorithm operating by combining the greedy forwarding algorithm and the contention-based forwarding algorithm described above. The area advanced forwarding algorithm can increase the forwarding efficiency by forwarding the packet to a specific direction using the greedy forwarding algorithm and forwarding the packet to the surroundings using the contention-based forwarding method, in order to minimize a delay as in the contention-based forwarding algorithm.

A forwarding algorithm for forwarding a packet to an area corresponding to a specific destination is referred to as a non-area algorithm. The non-area algorithm includes the greedy forwarding algorithm and the non-area contention-based forwarding algorithm. An algorithm that arrives at a specific area and distributes data to the surroundings is referred to as an area forwarding algorithm. The area forwarding algorithm includes a simple GeoBroadcast forwarding algorithm, the area contention-based forwarding algorithm, and the area advanced forwarding algorithm.

FIG. 14 illustrates multi-channel allocation used in an ITS system operation according to an embodiment of the present disclosure.

FIG. 14(a) illustrates US spectrum allocation for the ITS, and FIG. 14(b) illustrates EP spectrum allocation for the ITS.

In FIG. 14, the US and Europe have seven frequencies (each having a frequency bandwidth of 10 MHz) in the 5.9 GHz band (5.855 to 5.925 GHz). The seven frequencies may include one control channel (CCH) and six service channels (SCHs). As illustrated in FIG. 14(a), in the U.S., the CCH may be allocated to channel number 178. As illustrated in FIG. 14(b), in the Europe, the CCH may be assigned to channel number 180.

The Europe considers to additionally use the ITS-G63 band as an upper frequency band based on 5.9 GHz and to use the ITS-G5 band as a lower frequency band, in order to provide time-sensitive services with high data capacity. In such an environment, efficient multi-channel operation schemes need to be developed to provide high-quality service by properly allocating services to various multiple channels.

The control channel (CCH) refers to a radio channel used to exchange management frames and/or WAVE messages. The WAVE message may be a WAVE short message (WSM). The service channel (SCH) is a radio channel used to provide services and refers to any channel not the control channel. In an embodiment, the control channel may be used for communication of a WAVE short message protocol (WSMP) message or for communication of a system management message such as WAVE service advertisement (WSA). The SCH may be used for general-purpose application data communication, and the general-purpose application data communication may be coordinated by service related information such as WSA.

The WSA may also be referred to as service advertisement information. The WSA may provide information including an announcement of the availability of application-service. The WSA message may identify and describe the application service and the channel accessible by the service. In an embodiment, the WSA may include a header, service information, channel information, and WAVE routing advertisement information.

Service advertisement information for accessing services may be a periodic message. In an embodiment, a cooperative awareness message (CAM) may be a periodic message. The CAMs may be periodically broadcasted by the facilities layer.

A decentralized environmental notification message (DENM) may be an event message. The event message may be triggered and sent by detection of an event. A service message may be sent for the purpose of managing a session. In the following embodiments, the event message may include safety message/information. In addition, the service message may include non-safety message/information.

The V2X communication device may broadcast a cooperative awareness message (CAM) or a decentralized environmental notification message (DENM).

The CAM is distributed in an ITS network and provides information about at least one of a presence, a position, or a communication state of the ITS station. The DENM provides information on a detected event. The DENM may provide information about any driving situation or an event detected by the ITS station. For example, the DENM may provide information about situations such as an emergency electronic brake lamp, a vehicle accident, a vehicle problem, a traffic condition, and the like.

FIG. 15 illustrates a multi-channel operation (MCO) method of a V2X communication device according to an embodiment of the present disclosure.

In an embodiment, upon a multi-channel operation, if a V2X communication device uses one transceiver, the V2X communication device may access only the CCH and transmit and receive safety information. However, if the V2X communication device uses two or more transceivers, one transceiver may access the CCH and transmit and receive safety information, and other transceiver may perform channel switching.

As illustrated in FIG. 15, the V2X communication device including a plurality of transceivers may be configured such that one transceiver is fixed to the CCH, and other transceiver performs channel switching and accesses a plurality of SCHs. The channel switching is performed using a synchronous method. The V2X communication device performs the channel switching at the same synchronized timing. However, the channel switched SCH may be determined by each V2X communication device. In an embodiment, the CAM/DENM may be sent in the CCH, and non-safety related information may be transmitted in the SCH. However, safety related information may be transmitted in a specific SCH among the SCHs. In an embodiment, a safety related service may be transmitted in a SCH1. The V2X communication device may send/receive a safety related message, that is not sent/received in the CCH, by periodically accessing the SCH1. A specific SCH in which the safety related service is transmitted may be referred to as a reference SCH or the SCH1. The CCH is a reference channel of all the ITS-Ss, and the specific SCH in which the safety related service is transmitted may be referred to as a alternative reference SCH or the SCH1.

The non-safety related information may be transmitted in the SCH. For example, information for traffic efficiency may be transmitted. The following describes a method for a multi-hop transmission on the SCH in a multi-channel operation (MCO) environment in which the channel switching is generated.

FIG. 16 illustrates a communication situation in MCO according to an embodiment of the present disclosure.

In a multi-channel operation, ITS-Ss (ITS stations) should use the same channel to communicate with each other. When the multi-hop transmission is performed, channel transmitting data may change depending on a channel state. Even in this case, it is possible to communicate only between the same channels. To use the same channel, the ITS stations may identify channels to be used with each other through negotiation. The negotiation for packet forwarding may be performed. However, the negotiation may be performed so that the forwarding can be performed through channel accessed for the use of services.

As illustrated in FIG. 16, each V2X communication device may access a plurality of channels using a TDM method as necessary. Because both a vehicle 1 and a vehicle 2 access SCH1 on a first time slot, they can communicate with each other. However, because the vehicle 1 accesses SCH4 and the vehicle 2 accesses SCH3 on a second time slot, they can communicate with each other. Thus, the embodiment should be able to find forwarder candidates accessing the same channel so as to choose a forwarder for GeoNetworking transmission.

FIG. 17 illustrates a communication environment of ITS-Ss (ITS stations) according to an embodiment of the present disclosure.

In FIG. 17, ITS-S 0 is a source router transmitting a GeoNetworking packet. ITS-S 0, ITS-S 1, and ITS-2 use a plurality of transceivers and perform the MCO. ITS-3 uses one transceiver and is tuned only to CCH.

At a specific time (second time slot), only vehicles tuned to the same channel can communicate with each other. That is, if the ITS-S 0 transmits a packet on the second time slot, the ITS-S capable of forwarding the packet is limited. If the CCH is used, all the ITS-S 1, the ITS-S 2, and the ITS-3 can communicate with the ITS-S 0. However, if the SCH is used, the ITS-S capable of communicating with the ITS-S 0 on the second time slot is only the ITS-S 2 using the same channel as the ITS-S 0.

In the CCH, the ITS-S may periodically send a CAM. The CAM may be sent through a SHB method. A header of a SHB packet includes position information as well as a type, a speed, and heading of the ITS-S. The network layer may store, in a location table (LocT), position vector information including at least one of geographical position information, speed information, heading information, time stamp information indicating a time of measurement of position information, and position accuracy indicator (PAI) information indicating the accuracy of the provided position. Since the CAM is a message that is periodically sent at 1 Hz to 10 Hz, the LocT may also be periodically updated. Based on the periodically updated location table, the ITS-S may determine a forwarder for the multi-hop transmission in the CCH. However, it is difficult to properly select ITS-S candidates for the multi-hop transmission in the SCH because there is no channel information in the location table.

Accordingly, the present disclosure proposes a method of using a SHB packet header for multi-hop in the SCH because the SHB header capable of periodically updating position information has been already transmitted for the CAM in the CCH. The present disclosure proposes to add SCH ID information related to the SHB header to the SHB header because it needs to know more about the currently available SCH of a neighboring ITS-S so as to use the SHB packet header.

A service channel indication method for multi-hop transmission is described below.

FIG. 18 illustrates a SHB transmission cycle and a channel switching cycle of an ITS-S according to an embodiment of the present disclosure.

In the network layer, position information and speed information of neighboring vehicles updated in the location table are uploaded by information included in a header of a SHB packet or a header of a beacon packet. A CAM message informing about basic driving information of the vehicle may be sent through a SHB method in a cycle of 1 Hz to 10 Hz depending on a channel load. In an environment in which the CAM is sent, a beacon package may not be additionally transmitted. The CAM may be sent in the CCH.

In the multi-channel operation, a channel switching time may be set to, for example, time equal to 50 ms. A reference channel, i.e., SCH1 channel may be an auxiliary channel for safety, and the ITS-S may check the SCH1 in a predetermined cycle. A section accessing SCH-X or SCH-Y is a non-safety section, and each vehicle may select and access a channel that the vehicle has to independently use.

In the CCH, there may occur a difference between an update cycle and a channel switching cycle by the SHB as illustrated in FIG. 18. In FIG. 18, the ITS-S sends the CAM in a cycle of 100 ms in the CCH using one transceiver, and performs the channel switching in a cycle of 50 ms using other transceiver. If the ITS-S transmits a SHB packet including vehicle information, the neighboring vehicle may recognize that the ITS-S accesses the SCH1. However, if a multi-hop packet is transmitted in the SCH1, the ITS-S has accessed the SCH-X or the SCH-Y and thus cannot receive the multi-hop packet.

Accordingly, if information on SCH to be used for the next channel switching is previously transmitted, the neighboring vehicle may use this information to select a forwarder for the multi-hop packet transmission. Since all the neighboring vehicles synchronously perform the channel switching at the same timing, it is possible to determine more accurately the available SCH at a forwarding time if the neighboring vehicle knows the SCH to be switched.

FIG. 19 illustrates a packet header structure including SCH information according to an embodiment of the present disclosure.

FIG. 19 may illustrate a header of a beacon packet or a header of a SHB packet. A packet header may include a basic header, a common header, and an extended header. The packet header may include SCH information for MCO.

The SHB packet may include channel busy ratio (CBR) information. The CBR information may be transmitted by being included in the SHB packet header, and represents CBR information on any specific frequency channel, i.e., a degree of channel congestion. In an ad hoc network, decentralized congestion control (DCC) may be used to stabilize system operation and distribute traffic on a specific frequency channel. The CBR information may be exchanged between adjacent devices in order to efficiently operate a DCC algorithm and provide network robustness.

In an embodiment, the SCH information for the MCO may be included in the SHB packet header. As illustrated in FIG. 19, the SCH information may be located behind the CBR information. Since the CBR information can be measured and forwarded in a cycle of 100 ms, it may be preferable that the SHB header includes the SCH information upon the transmission of the CAM transmitting the CBR information. The SCH information may indicate an SCH ID that is currently being accessed or will be accessed.

In the embodiment of FIG. 19, the CAM message may be sent on the CCH. Thus, information on the CCH that is a current access channel may not be included. As illustrated in FIG. 19, a total of 6 bits are currently used, or a SCH ID to be used on the next time slot may be indicated in a flag format. Since the SCH ID is forwarded on the CCH, flags indicating the CCH are not included. If a plurality of transceivers is used, all the available SCHs are indicated as the flags and may inform the neighboring ITS-S of the channel used.

FIG. 20 illustrates a SHB transmission cycle and a channel switching cycle of an ITS-S according to another embodiment of the present disclosure.

In FIG. 20, a vehicle A uses a plurality of transceivers. The vehicle A accesses the CCH using a transceiver 1 and accesses the SCH using a transceiver 2. The transceiver 2 may sequentially access a plurality of SCHs based on MCO.

The vehicle A may broadcast that it is currently accessing SCH1 and will access SCH-X in the next channel switching by using a beacon packet or a SHB packet at a time t1. A vehicle B may record, in a location table, the currently accessing/available channel and the next accessing/available channel of the vehicle A. That is, the vehicle B may store the current available channel of the vehicle A as SCH_1 and the next available channel as SCH_X. Further, when the vehicle B receives the beacon packet or the SHB packet from the vehicle A, the vehicle B may obtain service channel information to update the location table.

The vehicle B may determine a forwarder at a time t4 for GeoNetworking transmission. The vehicle B is intended to transmit a GeoNetworking packet to the SCH_X. The vehicle B grasps that the vehicle A uses the SCH_X at the time t4, by referring to the location table. Thus, the vehicle B may determine a forwarder considering the vehicle A as a forwarder candidate.

FIG. 21 illustrates a packet header structure including SCH information according to another embodiment of the present disclosure.

FIG. 21 may illustrate a header of a beacon packet or a header of a SHB packet. A packet header may include a basic header, a common header, and an extended header. The packet header may include SCH information for MCO. The configuration equivalent to the packet configuration described above is not described in duplicate.

The extended header includes a current SCH field indicating a currently available SCH ID and a next SCH field indicating an available SCH ID after a next channel switching. The embodiment of FIG. 21 may indicate that the current SCH field is SCH_3 as illustrated in FIG. 21(a), and the next SCH field is SCH_1 as illustrated in FIG. 21(b). The SCH_1 may be an additional SCH channel for the transmission of safety information, and safety related information may be transmitted on the SCH_1 although the SCH_1 is a service channel. That is, the SCH_1 may be a reference SCH described above.

FIG. 22 illustrates a SHB transmission cycle and a channel switching cycle of an ITS-S according to another embodiment of the present disclosure.

In FIG. 22, a vehicle A uses a plurality of transceivers. The vehicle A accesses the CCH using a transceiver 1 and accesses the SCH using a transceiver 2. The transceiver 2 may sequentially access a plurality of SCHs based on MCO.

The channel switching by the MCO may be performed as illustrated in FIG. 22. That is, in the synchronized channel switching, a SCH_1 access time may be determined as a time point at which one second starts based on GPS. An access interval for the SCH_1 may be determined as a fixed interval. That is, the ITS-Ss performing the channel switching based on the MCO may access the SCH_1 for a specific interval at a specific time. In an embodiment, all the ITS-Ss may access the SCH_1 for a specific interval at a specific time. The SCH_1 is a service channel used for safety. If other service channel is used, a service announcement message (SAM) announcing which service is provided by which channel may be sent on the SCH_1. In the embodiment of FIG. 22, it is assumed that all the ITS-Ss know time at which the ITS-Ss periodically access the SCH_1. That is, in the synchronous channel switching method, it is assumed that all the time-synchronous ITS-Ss know a section in which the SCH_1 is used.

In the embodiment of FIG. 22, if the ITS-S currently accesses the SCH_1, SHB/beacon packet broadcasted on the CCH includes ID information of SCH to be used in the next channel switching, not the SCH_1. If the ITS-S currently accesses other SCH not the SCH_1, the SHB/beacon packet broadcasted on the CCH includes ID information of the currently accessing SCH, instead of ID information of the SCH to be used in the next channel switching.

At a time t1, because the vehicle A currently accesses the SCH_1, the vehicle A transmits SHB/beacon packet including SCH information indicating SCH_X. At a time t2, because the vehicle A currently accesses the SCH_1, the vehicle A transmits SHB/beacon packet including SCH information indicating SCH_Y. At a time t3, because the vehicle A currently accesses the SCH_Y and a next switching channel is SCH_1, the vehicle A transmits SHB/beacon packet including SCH information indicating SCH_Y.

In the embodiment of FIG. 22, SCH ID information for the SCH_1 is not transmitted. The ITS_S transmits next channel information as the SCH information if the ITS_S currently accesses the SCH_1, and transmits current channel information as the SCH information if the ITS_S is going to access the SCH_1. Even if a SHB/beacon cycle increases in the CCH for a reason of DDC, etc., neighboring routers receiving the SCH information are more likely to know channels that are available in the multi-hop transmission.

If the beacon packet or the SHB packet is transmitted only at SCH_1 interval, the beacon packet or the SHB packet may include SCH information used in a next synchronous interval following the SCH_1 interval. The beacon packet or the SHB packet may be transmitted on the CCH or transmitted on the SCH.

FIG. 23 illustrates a packet header structure including SCH information according to another embodiment of the present disclosure.

FIG. 23 illustrates configuration of a SHB packet header or a beacon packet header including SCH information according to the embodiment described in FIG. 22.

Source position vector (SO PV) information of a packet header includes time stamp information. Thus, a receiving ITS-S may determine whether a SCH ID indicated by the SCH information is a currently used SCH or a SCH to be channel-switched next, based on the time stamp information.

The packet header includes the SCH information. In the embodiment of FIGS. 22 and 23, the SCH information indicates current or next SCH information. The SCH information indicates the SCH ID except SCH_1.

FIG. 24 illustrates a location table update method of an ITS-S according to an embodiment of the present disclosure.

FIG. 24 illustrates a location table update method of an ITS-S receiving a SHB packet or a beacon packet in the embodiment of FIGS. 22 and 23.

As illustrated in FIG. 24, a location table includes SCH information. The SCH information includes current SCH information and next SCH information. The ITS-S may update at least one of a current SCH field or a next SCH field of a SCH field using packet header information that is currently input.

The ITS-S uses a timer memorizing a synchronous cycle to move information included in the next SCH field to the current SCH field after the channel switching. The ITS-S may configure a forwarder using the current SCH information when performing the forwarding for multi-hop transmission.

When determining an accessing SCH for a multi-channel operation, the SCH information may be used. If other ITS-Ss use a specific SCH, the embodiment can reduce interference between adjacent channels or reduce a path loss by determining a SCH to be used considering this.

If a forwarder is determined using the greedy forwarding algorithm, a SCH used by an ITS-S closest to a destination may also be determined as a transmission SCH. In the contention-based forwarding, if there is no neighboring ITS-S using the same SCH, all the transmission packets may be discarded. Thus, a packet forwarding probability can be improved by transmitting the packet after the SCH switching. If there is no neighboring ITS using the same SCH as a sender even after the packet switching generation, the packet may be discarded.

FIG. 25 illustrates a packet header structure including SCH information according to another embodiment of the present disclosure.

As described above, if the ITS-S transmits the SHB/beacon packet on the CCH for the multi-hop transmission, the ITS-S may add the SCH ID that is being used or is going to be used in the SCH. In an embodiment, in a synchronous channel switching environment in which all the ITS-Ss are simultaneously tuned to the SCH_1, the packet may be transmitted on the SCH_1. For example, at least one of the SHB packet or the beacon packet may be transmitted for an interval in which the ITS-S accesses the SCH_1. In this case, the packet may include only next accessing SCH ID information.

In FIG. 25, the ITS-S may transmit the beacon packet or the SHB packet for an interval in which the ITS-S accesses the SCH_1. The ITS-S adds and transmits, to a header, the SCB information indicating the next accessing SCH ID upon the transmission of the beacon packet/SHB packet. At a time t1, when an ITS-S of a vehicle A transmits the beacon packet or the SHB packet, the SCH information included in a packet header indicates SCH_X. At a time t2, when the ITS-S of the vehicle A transmits the beacon packet or the SHB packet, the SCH information included in the packet header indicates SCH_Y.

Since neighboring vehicles receiving the beacon packet or the SHB packet from the vehicle A on the SCH_1 can know the SCH the vehicle A will use, this can be considered upon GeoNetworking forwarder selection.

FIG. 26 illustrates a pseudo-code of a greedy forwarding algorithm according to an embodiment of the present disclosure.

In the pseudo-code of the present disclosure, elements are defined as follows.

P: GN packet to be forwarded
i: i-th LctTE
NH: LocTE identified as the next hop. NH_LL_ADDR is its link layer address. That is, a router that is can be identified as the next hop in LocTE. NH.LL_ADDR is a link layer address of the router.
NH_LL_ADDR: link layer address of the next hop. It can become a value forwarded to an actual access layer.
EPV: ego position vector
PV_P: destination position vector included in GeoNetworking packet
PV_I: position vector of the i-th LocTE
MFR: progress according to the most forward with radius (MFR) policy. It can be set as a distance between a router itself and a destination.
B: forwarding packet buffer (it can be an US forwarding buffer or a BC forwarding buffer according to a packet type)
TC: traffic class of GN-Data.request (source operation) or field in the received common header (forwarder operation).

In line 13, the router can set a distance between itself and the destination to the MFR.

As in lines 14 to 21, the router obtains a distance between an i-th router and the neighboring router stored in the LocTE, and searches for a router having a minimum distance to the destinations of the routers stored in the LocTE.

As in lines 22 and 23, the router sets a MAC address of the router having the minimum distance to the destination to NH_LL_ADDR.

As in line 24, if an MFR value is greater than a distance between the router and the destination, the router determines that there is no neighboring router to forward.

As in lines 25 and 26, if store carry & forward (SCF) is enabled, the value is stored in the "forwarding packet buffer" for a predetermined time, and if an ad-hoc router is detected, forwarding is executed.

As in lines 28 and 29, if the SCF is disabled, the router sets the destination address of the MAC to BCAST and broadcasts the packet.

In the embodiment of the present disclosure, the router may consider, as candidates, only routers, that use the same SCH at a packet transmission time, among routers stored in the LocTE. To this end, the LocTE according to the present disclosure includes the above-described SCH information. Thus, when the plurality of routers access the SCH based on the MCO, reliability of the pack transmission can be improved.

FIG. 27 illustrates configuration of a V2X communication device according to an embodiment of the present disclosure.

In FIG. 27, a V2X communication device 27000 may include a communication unit 27010, a processor 27020, and a memory 27030.

The communication unit 27010 is connected to the processor 27020 and may transmit/receive a radio signal. The communication unit 27010 may up-convert data received from the processor 27020 into a transmission/reception band to transmit a signal, or may down-convert the received signal. The communication unit 27010 may implement at least one operation of the physical layer or the access layer.

The communication unit 27010 may include a plurality of sub-RF units in order to perform communication according to a plurality of communication protocols. In one embodiment, the communication unit 27010 may perform data communication based on ITS-G5 wireless communication technology based on a physical broadcast technology of dedicated short range communication (DSRC), IEEE 802.11 and/or 802.11p standard, and IEEE 802.11 and/or 802.11p standard, 2G/3G/4G(LTE)/5G wireless cellular communication technology including satellite/wideband wireless mobile communication, wideband terrestrial digital broadcasting technology such as DVB-T/T2/ATSC, GPS technology, IEEE 1609 WAVE technology, and the like. The communication unit 27010 may include a plurality of transceivers that implement the respective communication technologies.

The communication unit 27010 includes the plurality of transceivers, and wherein one transceiver may communicate in CCH, and other transceiver may communicate in SCH. The communication unit 27010 may perform a multi-channel operation using the plurality of transceivers.

The processor 27020 is connected to the RF unit 27030 and may implement operations of the layers according to the ITS system or the WAVE system. The processor 27020 may be configured to perform operations according to various embodiments of the present disclosure according to the figures and the description described above. Furthermore, at least one of a module, data, a program or software that implements operations of the V2X communication device 27000 according to various embodiment of the present disclosure may be stored in the memory 27010 and executed by the processor 27020.

The memory 27010 is connected to the processor 27020 and stores various information for driving the processor 27020. The memory 27010 may be included inside the processor 27020 or installed outside the processor 27020, and may be connected to the processor 27020 by known means.

The processor 27020 of the V2X communication device 27000 may perform the forwarding algorithm described in the present disclosure to perform the GeoNetworking packet transmission. The GeoNetworking packet transmission method of the V2X communication device 27000 is described below.

FIG. 28 is a flow chart illustrating a GeoNetworking transmission method according to an embodiment of the present disclosure.

A V2X communication device receives a beacon packet or a SHB packet in S28010.

The beacon packet or the SHB packet may be received on a CCH or a SCH. A header of the beacon packet or the SHB packet may include service channel (SCH) information for a MCO. The SCH information may include at least one of a current SCH ID or a next SCH ID that is accessed by the neighboring V2X communication device transmitting the beacon packet or the SHB packet. The description of the SCH information and a method of transmitting and receiving the SCH information is the same as the description with reference to FIGS. 18 to 25.

The V2X communication device configures location information in S28020.

The location information LocT is a local data structure maintained by the V2X communication device and includes information on V2X communication devices executing a GeoNetworking protocol. As described above, the location information includes at least one of GeoNetworking address information, link layer address information, type information, position vector information, or SCH information about at least one neighboring V2X communication device receiving a GeoNetworking packet. The above description is applied to the LocT. The SCH information may include at least one of a currently accessed SCH ID and a next accessed SCH ID. The description of configuration and management of a location table according to the transmission and reception of the SCH information is the same as the description with reference to FIGS. 18 to 25.

The V2X communication device determines a forwarder from among the neighboring V2X communication devices included in the location table and sets an address of the determined forwarder to a link layer address in S28030.

As described above, the V2X communication device may set a link layer address of a forwarder candidate to a next hop link layer address if a distance between the forwarder candidate and a destination is less than a distance between the V2X communication device and the destination. That is, if the distance between the forwarder candidate and the destination is less than the distance between the V2X communication device and the destination, the forwarder candidate may be determined as the forwarder, and an address of the determined forwarder may be set to a next hop link layer address of a packet.

The V2X communication device transmits the GeoNetworking packet to a first SCH based on the set link layer address in S28040.

In the present disclosure, the V2X communication device may determine the forwarder considering the SCH information. The V2X communication device may determine, as the forwarder, at least one neighboring V2X communication device, that uses the first SCH to transmit the GeoNetworking packet, among the neighboring V2X communication devices.

A step of determining the first SCH by the V2X communication device may be further included. The V2X communication device may determine a forwarder, that is most advantageous for the packet forwarding, among the neighboring V2X communication devices, and determine a SCH, that the corresponding forwarder uses at a transmission time, as a transmission SCH (first SCH). The V2X communication device may transmit the GeoNetworking packet on the determined first SCH.

As described above, the SCH information may be forwarded on the CCH, or forwarded on the SCH. When the packet including the SCH information is received on a reference SCH, the SCH information may indicate an ID of other SCH except the reference SCH.

The embodiments described above are implemented by combinations of components and features of the present disclosure in predetermined forms. Each component or feature should be considered selectively unless specified separately. Each component or feature may be carried out without being combined with another component or feature. Moreover, some components and/or features are combined with each other and can implement embodiments of the present disclosure. The order of operations described in embodiments of the present disclosure may be changed. Some components or features of one embodiment may be included in another embodiment, or may be replaced by corresponding components or features of another embodiment. It is apparent that some claims referring to specific claims may be combined with another claims referring to the claims other than the specific claims to constitute the embodiment or add new claims by means of amendment after the application is filed.

Embodiments of the present disclosure can be implemented by various means, for example, hardware, firmware, software, or combinations thereof. When embodiments are implemented by hardware, one embodiment of the present disclosure can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

When embodiments are implemented by firmware or software, one embodiment of the present disclosure can be implemented by modules, procedures, functions, etc. performing functions or operations described above. Software code can be stored in a memory and can be driven by a processor. The memory is provided inside or outside the processor and can exchange data with the processor by various well-known means.

It is apparent to those skilled in the art that the present disclosure can be embodied in other specific forms without departing from essential features of the present disclosure. Accordingly, the aforementioned detailed description should not be construed as limiting in all aspects and should be considered as illustrative. The scope of the present disclosure should be determined by rational construing of the appended claims, and all modifications within an equivalent scope of the present disclosure are included in the scope of the present disclosure.

Mode for Invention

It is obvious to those skilled in the art that the present disclosure can be changed and modified in various ways without departing from the spirit or range of the present disclosure. Accordingly, the present disclosure is intended to include all the changes and modifications provided by the appended claims and equivalents thereof.

In the present disclosure, both the device and method inventions have been mentioned, and the descriptions of both the device and method inventions can be complementarily applied.

Various embodiments have been described in the best form for implementing the present disclosure.

Industrial Applicability

The present disclosure is used in a series of vehicle communication fields.

It is obvious to those skilled in the art that the present disclosure can be changed and modified in various ways without departing from the spirit or range of the present disclosure. Accordingly, the present disclosure is intended to include all the changes and modifications provided by the appended claims and equivalents thereof.

The invention claimed is:

1. A GeoNetworking transmission method of a V2X communication device, the method comprising:
receiving a beacon packet or a single hop broadcast (SHB) packet;
configuring location information, the location information including information about at least one neighboring V2X communication device executing a GeoNetworking protocol;
determining a forwarder from neighboring V2X communication devices included in a location table and setting an address of the determined forwarder to a link layer address; and
transmitting a GeoNetworking packet to a first service channel (SCH) based on the link layer address,
wherein a header of the beacon packet or the SHB packet includes SCH information for a multi-channel operation (MCO),
wherein the SCH information indicates at least one of a current SCH ID or a next SCH ID that is accessed by a neighboring V2X communication device transmitting the beacon packet or the SHB packet, and
wherein based on the beacon packet or the SHB packet including the SCH information being received on a specific SCH, the SCH information indicates an ID of another SCH other than the specific SCH.

2. The method of claim 1, wherein the location information includes at least one of GeoNetworking address information, link layer address information, type information, position vector information, or the SCH information about at least one neighboring V2X communication device receiving the GeoNetworking packet.

3. The method of claim 1, wherein the determining of the forwarder further comprises determining, as the forwarder, one of one or more V2X communication devices using the first SCH among the neighboring V2X communication devices.

4. The method of claim 1, wherein the beacon packet or the SHB packet including the SCH information is received on a control channel (CCH) or a SCH.

5. A V2X communication device comprising:
a memory configured to store data;
a communication unit including a transceiver configured to transmit and receive a radio signal including a GeoNetworking packet; and
a processor configured to control the memory and the communication unit,
wherein the processor is configured to:

receive a beacon packet or a single hop broadcast (SHB) packet;

configure location information, the location information including information about at least one neighboring V2X communication device executing a GeoNetworking protocol;

determine a forwarder from neighboring V2X communication devices included in a location table and set an address of the determined forwarder to a link layer address; and transmit the GeoNetworking packet to a first service channel (SCH) based on the link layer address, wherein a header of the beacon packet or the SHB packet includes SCH information for a multi-channel operation (MCO), wherein the SCH information indicates at least one of a current SCH ID or a next SCH ID that is accessed by a neighboring V2X communication device transmitting the beacon packet or the SHB packet, and wherein based on the beacon packet or the SHB packet including the SCH information being received on a specific SCH, the SCH information indicates an ID of another SCH other than the specific SCH.

6. The V2X communication device of claim 5, wherein the location information includes at least one of GeoNetworking address information, link layer address information, type information, position vector information, or the SCH information about at least one neighboring V2X communication device receiving the GeoNetworking packet.

7. The V2X communication device of claim 5, wherein the determining of the forwarder is performed by determining, as the forwarder, one of one or more V2X communication devices using the first SCH among the neighboring V2X communication devices.

8. The V2X communication device of claim 5, wherein the beacon packet or the SHB packet including the SCH information is received on a control channel (CCH) or a SCH.

* * * * *